US009054387B2

(12) United States Patent
Viavattine et al.

(10) Patent No.: US 9,054,387 B2
(45) Date of Patent: *Jun. 9, 2015

(54) ELECTRODE ASSEMBLY INCLUDING MANDREL HAVING REMOVABLE PORTION

(75) Inventors: Joseph J. Viavattine, Vadnais Heights, MN (US); Paul B. Aamodt, Minnetonka, MN (US); Hailiang (Jeff) Zhao, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 1113 days.

This patent is subject to a terminal disclaimer.

(21) Appl. No.: 13/044,178

(22) Filed: Mar. 9, 2011

(65) Prior Publication Data

US 2011/0250480 A1   Oct. 13, 2011

Related U.S. Application Data

(60) Provisional application No. 61/321,693, filed on Apr. 7, 2010.

(51) Int. Cl.
| | |
|---|---|
| *H01M 10/0587* | (2010.01) |
| *H01M 10/04* | (2006.01) |
| *H01M 10/38* | (2006.01) |
| *H01M 10/28* | (2006.01) |
| *H01M 4/04* | (2006.01) |

(52) U.S. Cl.
CPC .......... *H01M 10/0431* (2013.01); *H01M 10/38* (2013.01); *H01M 10/287* (2013.01); *H01M 4/04* (2013.01); *H01M 10/286* (2013.01); *H01M 10/288* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 1,861,006 | A | 5/1932 | Goodman |
| 3,153,180 | A | 10/1964 | Bellmore |
| 3,615,834 | A | 10/1971 | Sundberg |

(Continued)

FOREIGN PATENT DOCUMENTS

| | | |
|---|---|---|
| DE | 26 45 863 | 4/1977 |
| EP | 1 357 619 | 10/2003 |

(Continued)

OTHER PUBLICATIONS

International Search Report PCT/US2011/051687 (4 pgs.).

(Continued)

*Primary Examiner* — Carlos Barcena
*Assistant Examiner* — Wojciech Haske

(57) ABSTRACT

Provided is an electric storage battery including a jelly roll type electrode assembly having a mandrel. The mandrel includes a positive portion, a negative portion and a removable portion. In some embodiments, the mandrel is planar having two faces with a groove on each of the positive and negative portions. The grooves can be on the same or different faces of the mandrel. The grooves are dimensioned to accommodate a positive and negative feedthrough pin. The electrodes are wrapped around the mandrel using the removable portion to wind the mandrel. Once wrapped, the removable portion can be detached. The positive portion and the negative portion are left in the electrode assembly insulated from each other. The mandrel allows tighter wrapping of the jelly roll assembly, increasing battery miniaturization and also results in electrode assemblies in which after-placement of tabs does not result in burrs or shorting.

22 Claims, 12 Drawing Sheets

(56) References Cited

U.S. PATENT DOCUMENTS

| | | | |
|---|---|---|---|
| 3,734,778 | A | 5/1973 | Huf et al. |
| 3,791,868 | A | 2/1974 | Compton et al. |
| 4,028,138 | A | 6/1977 | Dey |
| 4,064,725 | A | 12/1977 | Hug et al. |
| 4,092,386 | A | 5/1978 | Rigstad |
| 4,099,401 | A | 7/1978 | Hug et al. |
| 4,158,300 | A | 6/1979 | Hug et al. |
| 4,212,179 | A | 7/1980 | Juergens |
| 4,332,868 | A | 6/1982 | Anand et al. |
| 4,476,624 | A | 10/1984 | Klein et al. |
| 4,863,815 | A | 9/1989 | Chang et al. |
| 4,879,190 | A | 11/1989 | Lundsgaard |
| 4,930,327 | A | 6/1990 | Aidlin et al. |
| 4,966,822 | A | 10/1990 | Johnston |
| 4,975,095 | A * | 12/1990 | Strickland et al. ........... 29/623.1 |
| 5,045,086 | A | 9/1991 | Juergens |
| 5,047,068 | A | 9/1991 | Stoklosa |
| 5,323,527 | A | 6/1994 | Ribordy et al. |
| 5,326,652 | A | 7/1994 | Lake |
| 5,486,215 | A | 1/1996 | Kelm et al. |
| 5,509,942 | A | 4/1996 | Dodge |
| 5,521,021 | A | 5/1996 | Alexandres et al. |
| 5,532,075 | A | 7/1996 | Alexandres et al. |
| 5,549,717 | A | 8/1996 | Takeuchi et al. |
| 5,603,737 | A | 2/1997 | Marincic et al. |
| 5,677,078 | A | 10/1997 | Juergens et al. |
| 5,700,299 | A | 12/1997 | Clark |
| 5,791,041 | A | 8/1998 | Miyata et al. |
| 6,051,038 | A | 4/2000 | Howard et al. |
| 6,190,426 | B1 | 2/2001 | Thibault et al. |
| 6,391,068 | B2 | 5/2002 | Yoshida et al. |
| 6,420,065 | B1 | 7/2002 | Yde-Andersen et al. |
| 6,443,999 | B1 | 9/2002 | Cantave et al. |
| 6,485,859 | B1 | 11/2002 | Szyszkowski |
| 6,627,344 | B2 | 9/2003 | Kang et al. |
| 6,670,071 | B2 | 12/2003 | Skinlo et al. |
| 6,692,542 | B1 | 2/2004 | Kashiyama et al. |
| 6,841,296 | B2 | 1/2005 | Ng et al. |
| 6,923,837 | B2 | 8/2005 | Longhi, Jr. et al. |
| 6,951,576 | B1 | 10/2005 | Takeuchi |
| 7,041,413 | B2 | 5/2006 | Tsukamoto et al. |
| 7,060,387 | B2 | 6/2006 | Kim et al. |
| 7,070,881 | B2 * | 7/2006 | Kishiyama et al. ........... 429/161 |
| 7,205,068 | B2 | 4/2007 | Fong et al. |
| 7,378,181 | B2 | 5/2008 | Skinlo |
| 7,410,512 | B2 | 8/2008 | Tsukamoto et al. |
| 7,416,811 | B2 | 8/2008 | Nakahara et al. |
| 7,432,012 | B2 | 10/2008 | Tsukamoto et al. |
| 7,435,507 | B2 | 10/2008 | Ohata et al. |
| 7,442,465 | B2 | 10/2008 | Kim et al. |
| 7,481,852 | B2 | 1/2009 | Longhi, Jr. et al. |
| 7,488,553 | B2 | 2/2009 | Tsukamoto et al. |
| 7,501,201 | B2 | 3/2009 | Ishikawa et al. |
| 7,569,305 | B2 | 8/2009 | Skinlo et al. |
| 7,578,898 | B2 | 8/2009 | Le Gal |
| 7,601,461 | B2 | 10/2009 | Skinlo et al. |
| 7,632,603 | B2 | 12/2009 | Tsukamoto et al. |
| 7,666,545 | B2 | 2/2010 | Oh et al. |
| 7,879,486 | B2 | 2/2011 | Tsukamoto et al. |
| 2003/0003356 | A1 | 1/2003 | Tsukamoto et al. |
| 2004/0049908 | A1 | 3/2004 | Tsukamoto et al. |
| 2004/0053115 | A1 | 3/2004 | Skinlo |
| 2004/0053116 | A1 | 3/2004 | Skinlo |
| 2004/0053118 | A1 | 3/2004 | Tsukamoto et al. |
| 2004/0053119 | A1 | 3/2004 | Tsukamoto et al. |
| 2004/0142237 | A1 | 7/2004 | Asano |
| 2004/0214076 | A1 | 10/2004 | Tsukamoto et al. |
| 2005/0042516 | A1 | 2/2005 | Oh et al. |
| 2005/0123824 | A1 | 6/2005 | Ishikawa et al. |
| 2005/0174092 | A1 | 8/2005 | Dougherty et al. |
| 2006/0035147 | A1 | 2/2006 | Lam et al. |
| 2006/0073380 | A1 | 4/2006 | Kim et al. |
| 2006/0085971 | A1 | 4/2006 | Andrews et al. |
| 2006/0123622 | A1 | 6/2006 | Guy |
| 2006/0222943 | A1 | 10/2006 | Fujikawa et al. |
| 2006/0263686 | A1 | 11/2006 | Zhao |
| 2007/0059590 | A1 | 3/2007 | Hayashi et al. |
| 2007/0059599 | A1 | 3/2007 | Rubino et al. |
| 2007/0138905 | A1 | 6/2007 | Axelrod et al. |
| 2007/0180686 | A1 * | 8/2007 | Woo .......................... 29/623.1 |
| 2008/0026283 | A1 | 1/2008 | Park et al. |
| 2008/0026293 | A1 | 1/2008 | Marple et al. |
| 2008/0138699 | A1 | 6/2008 | Kim et al. |
| 2008/0248375 | A1 | 10/2008 | Cintra et al. |
| 2009/0208832 | A1 | 8/2009 | Beard |
| 2010/0273036 | A1 | 10/2010 | Marple et al. |

FOREIGN PATENT DOCUMENTS

| | | |
|---|---|---|
| JP | 8 050915 | 2/1996 |
| JP | 9 120822 | 5/1997 |
| JP | 2000 348754 | 12/2000 |
| WO | WO 90/16089 | 12/1990 |
| WO | WO 2008/018207 | 2/2008 |

OTHER PUBLICATIONS

International Search Report PCT/US2011/051685 (4 pgs.).
International Search Report PCT/US2011/029320 (3 pgs.)
International Search Report PCT/US2011/029323 (3 pgs.).
International Search Report PCT/US2011/029325 (3 pgs.).
International Search Report PCT/US2011/029322, dated Aug. 26, 2011 (3 pgs.)

* cited by examiner

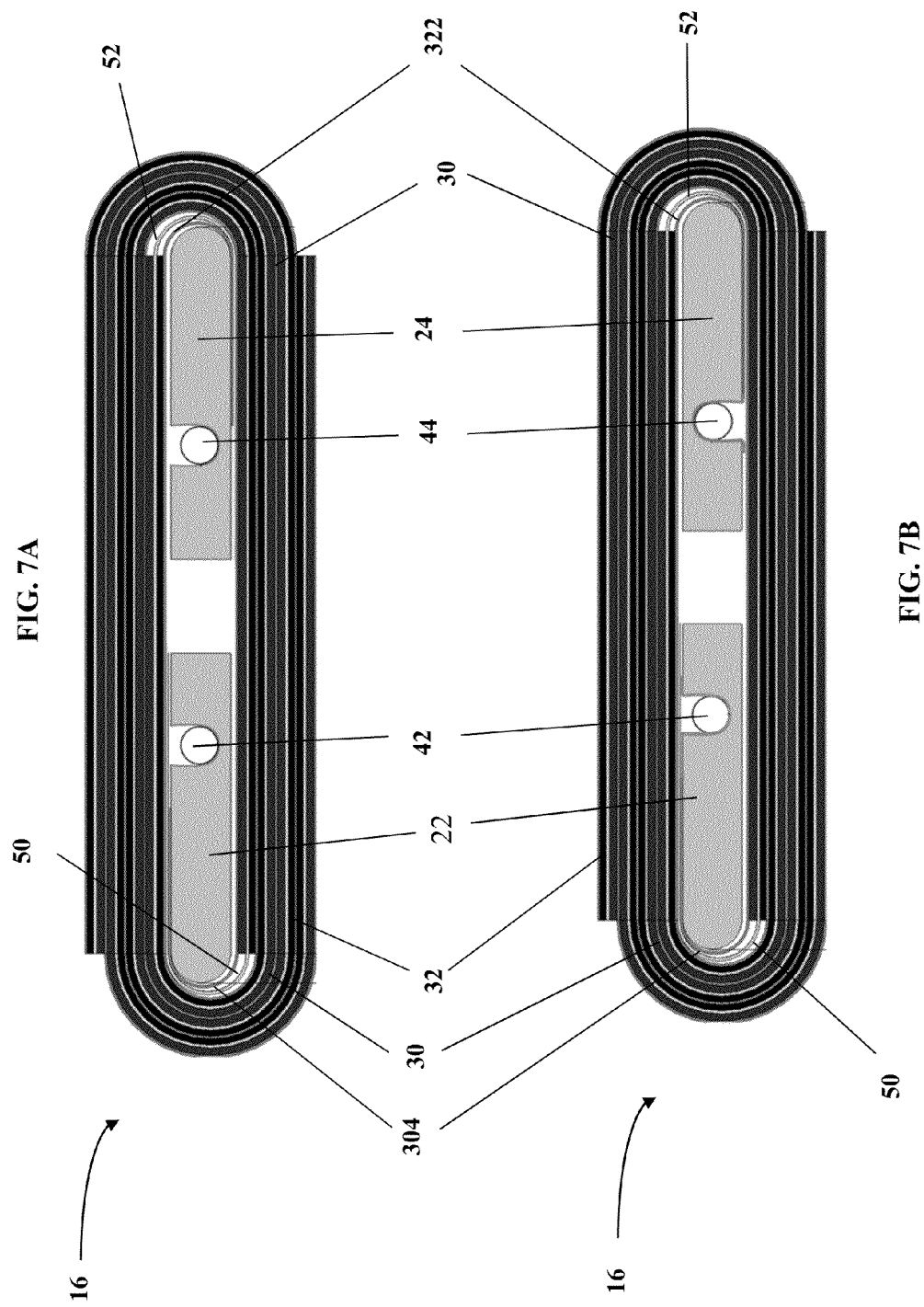

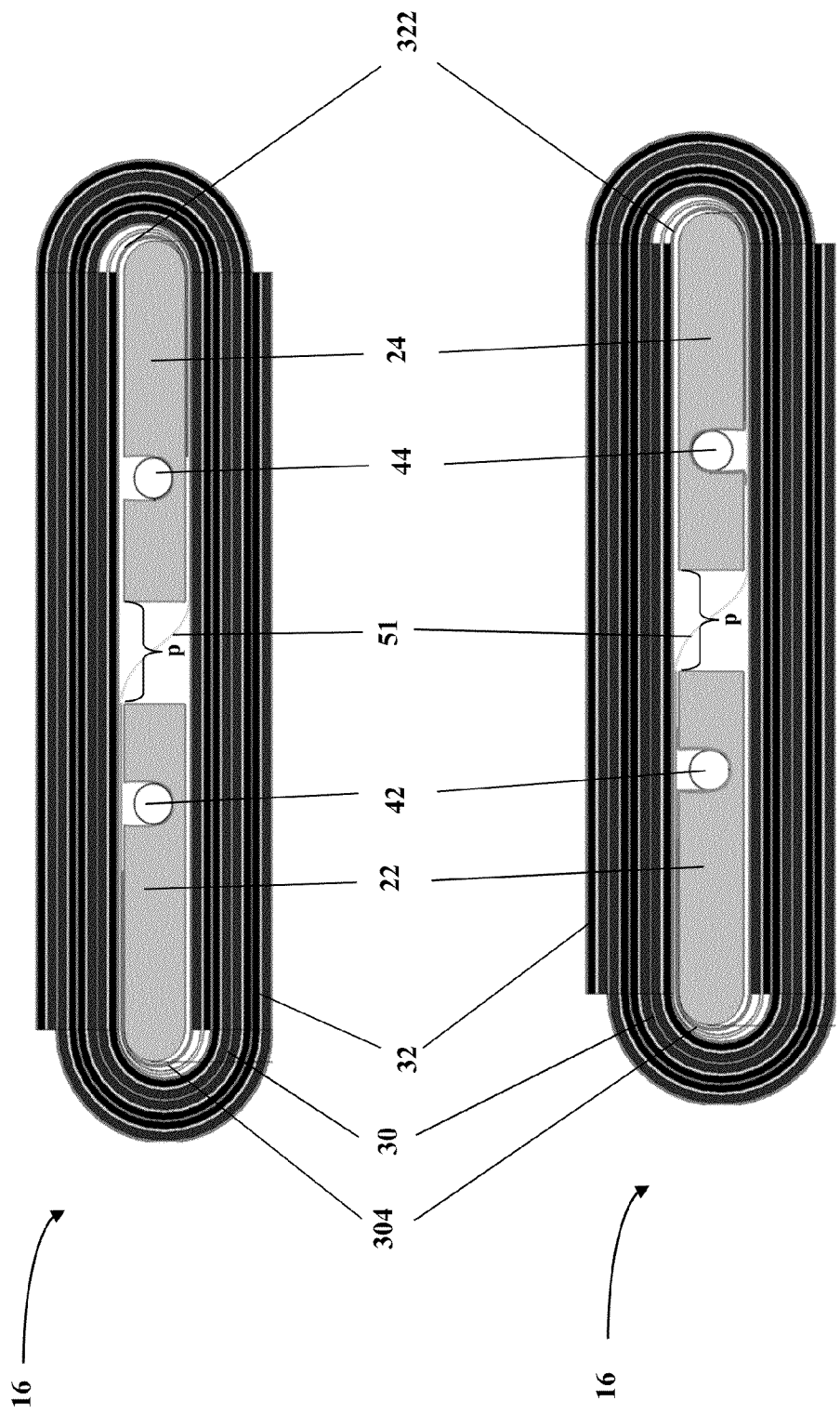

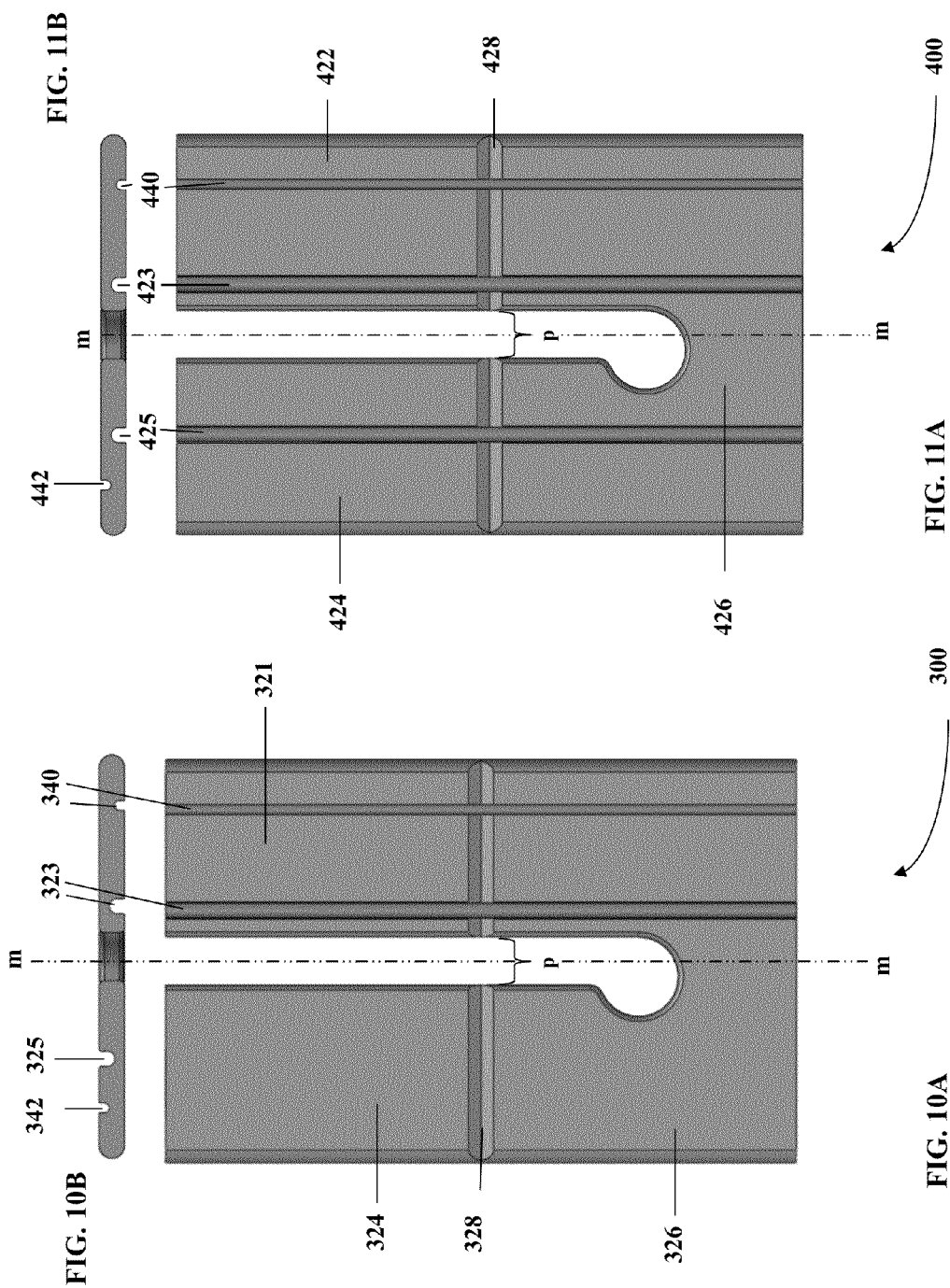

ELECTRODE ASSEMBLY INCLUDING MANDREL HAVING REMOVABLE PORTION

CROSS-REFERENCE TO RELATED APPLICATIONS

This application claims priority from provisional application Ser. No. 61/321,693 filed Apr. 7, 2010, hereby incorporated by reference in its entirety.

FIELD OF THE INVENTION

The invention relates to a battery and to a method of manufacture using a mandrel that allows for increased compactness.

BACKGROUND OF THE INVENTION

Batteries for medical devices have demanding requirements. They should be small, have a long life, high power output, low self-discharge rate, compact size and high reliability. The need for miniaturization while maintaining or increasing output means that as much of the battery footprint as possible should be used for power storage resulting in the concomitant elimination of dead space. However, while the elimination of dead space should result in greater miniaturization, it also results in a greater difficulty of assembly due to the increasingly small size of the component parts.

Traditionally, jelly roll type batteries have been made by using a mandrel to wrap electrodes around. Once wrapped, the mandrel is removed providing a jelly roll wrapped electrode assembly for use in a battery. However, removal of the mandrel from the core of the jelly roll inherently presents the potential of damaging the jelly roll due to the possibility of pulling the core of the jelly roll out with the mandrel. Therefore, the jelly roll should not be wrapped tight to avoid this problem. Conversely, a loosely wrapped jelly roll wastes space and decreases battery capacity and power due to size constraints. More recently, jelly roll storage batteries have been made using a rod-shaped, non-conductive, non-deformable core around which electrodes are wrapped. Conductive tabs are added to each electrode to complete the circuit.

U.S. Pat. No. 7,442,465 to Kim et al., discloses a rechargeable battery which has a non-deformation core. Once the positive and negative electrodes are wound around the core, conductive tabs are attached to the electrodes and the core serves to prevent deformation of the jelly roll, but does not conduct current.

Pre Grant Publication U.S. 2003/0134185 A1 to Nakahara et al. describes a feedthrough pin that is directly connected to an inner end of an electrode. The pin extends from the jelly roll and through the battery case and functions as a battery terminal. The feedthrough pin fits into a slotted 'C'-shaped mandrel. The positive electrode is conductively connected to the pin which fits within the 'C'-shaped mandrel. As the positive electrode is wound, a separator is inserted between the feedthrough pin/mandrel and the positive electrode. A negative electrode is inserted between the separator and the pin/mandrel. The separator and negative electrode are held in the jelly roll by the tension created between the feedthrough pin/mandrel and the positive electrode. After winding, a metal tab is welded to the negative electrode and the tab contacts the battery case endcap to complete the circuit.

Both of the aforementioned batteries require the placement of at least one tab on an electrode to complete the circuit during or after winding the electrodes. In either case, the passive connection of one of the electrodes to the case is required for the circuit to be completed.

Therefore, a need exists for an improved electrode assembly.

SUMMARY OF THE INVENTION

The present invention provides a mandrel useful in making a jelly roll electrode assembly and an electric storage battery. The mandrel includes a positive portion, a negative portion and one or more removable portions adjacent to the positive and/or negative portions. A passage is provided between the positive and negative portions. The mandrel can be planar having two faces with a groove on each of the positive and negative portions. The grooves can be on the same or opposite faces of the mandrel. The grooves are dimensioned to accommodate positive and negative feedthrough pins.

The positive and negative electrodes and the positive and negative feedthrough pins can be conductively connected to the mandrel to provide an electrode assembly. One or more separators can be used to insulate the electrodes. The removable portion can be used as a handle when the mandrel is rotated to wrap the electrode and the one or more separators around the mandrel to make a jelly roll electrode assembly. The jelly roll assembly can be secured by heat sealing one or more protruding ends of the one or more separators to each other or to an underlying separator layer.

In one aspect, when an electrode assembly is made using the mandrel, a single separator can be passed through a passage between the positive and the negative portion of the mandrel. In this embodiment the invention includes an electrode assembly comprising: (a) a planar mandrel having a first face and a second face with the mandrel including a positive portion, a negative portion; (b) a positive electrode; (c) a negative electrode; (d) a positive feedthrough pin; (e) a negative feedthrough pin; and (f) a single separator. The mandrel includes a passage from the first face to the second face dividing the positive portion and the negative portion. The separator passes through the passage in the mandrel so as to be juxtaposed to the positive portion on the first face of the mandrel and the negative portion on the second face of the mandrel. The positive electrode, the separator and the negative electrode can be wound around the mandrel to provide a jelly roll electrode assembly. The mandrel further includes one or more removable portions adjacent to the positive and/or negative portions of the mandrel. The removable portions can be removed after assembly.

In another aspect, the invention provides for making a conductive connection between the electrodes and the feedthrough pins using the mandrel as a platform. In this embodiment, the positive and negative electrodes can be electrically connected on the mandrel. When the mandrel is made of an electrically conductive material, the positive and negative feedthrough pins and the positive and negative electrodes do not have to be in direct contact with each other to be electrically connected on the mandrel. When the mandrel is made of a non-electrically conductive material, the positive and negative electrodes can be directly opposed to each other on the mandrel. By providing a conductive connection between the electrodes and the feedthrough pins on the mandrel, exposed ends of the feedthrough pins provide terminals for the battery. This construction provides for a battery case that is neutral to.

In still another aspect, the invention provides a method of sealing a coiled jelly roll electrode assembly by utilizing protruding ends of one or more separators used in the electrode assembly. In this embodiment, the terminus of one or more separators extends beyond the length of one or more electrodes of the wrapped jelly roll assembly providing a protruding end(s) of the separator. The protruding end(s) of the separator extends beyond the electrodes sufficient to be sealed to each other or to an underlying layer of separator. Generally, excess separator material can be wrapped 1 to 5 times around the jelly roll. In one aspect, the wrapped jelly roll assembly can be contacted with a heating block on one or more sides of the jelly roll. The separator material separator can be heat sealed to an underlying layer of separator, thus securing the jelly roll assembly in a coiled position.

The invention further includes a method of making an electric storage battery including placing the electrode assembly in a case.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be apparent from the description, as set forth hereinafter.

BRIEF DESCRIPTION OF THE FIGURES

Various exemplary embodiments of the compositions and methods according to the invention will be described in detail, with reference to the following figures wherein:

FIG. 2A is a side-plan view of the mandrel. FIG. 2B is a top-plan view of the mandrel of FIG. 2A;

FIGS. 7A, 7B, 7C and 7D are schematic, top-plan views of four jelly roll electrode assemblies using different mandrels to make an interconnect joint according to the invention;

FIG. 8A shows the electrode assembly in the battery case before the removable portion is detached. FIG. 7B shows the completed battery with the removable portion detached and the electrode assembly ready to be sealed in the battery case;

FIGS. 10A and 10B illustrate a separate embodiment of a mandrel useful in making an interconnect according to the invention. This embodiment of the interconnect joint uses a mandrel having a separate stud pin for conductively connecting the positive and negative electrodes. FIG. 10A is a side-plan view showing a mandrel with the location for a groove including a welding site for a stud pin used to complete the connection between the mandrel and the positive and negative electrode pins. FIG. 10B is a top-plan view of the mandrel shown in FIG. 10A;

FIGS. 11A and 11B illustrate another embodiment of a mandrel useful in making an interconnect according to the invention. FIG. 11A is a side-plan view of the mandrel according to the invention and FIG. 11B is a top-plan view of the same mandrel. This embodiment of the interconnect joint uses a mandrel having separate grooves for stud pins for conductively connecting the positive and negative electrodes;

DETAILED DESCRIPTION OF THE EXEMPLARY EMBODIMENTS

In General

Figure 1:
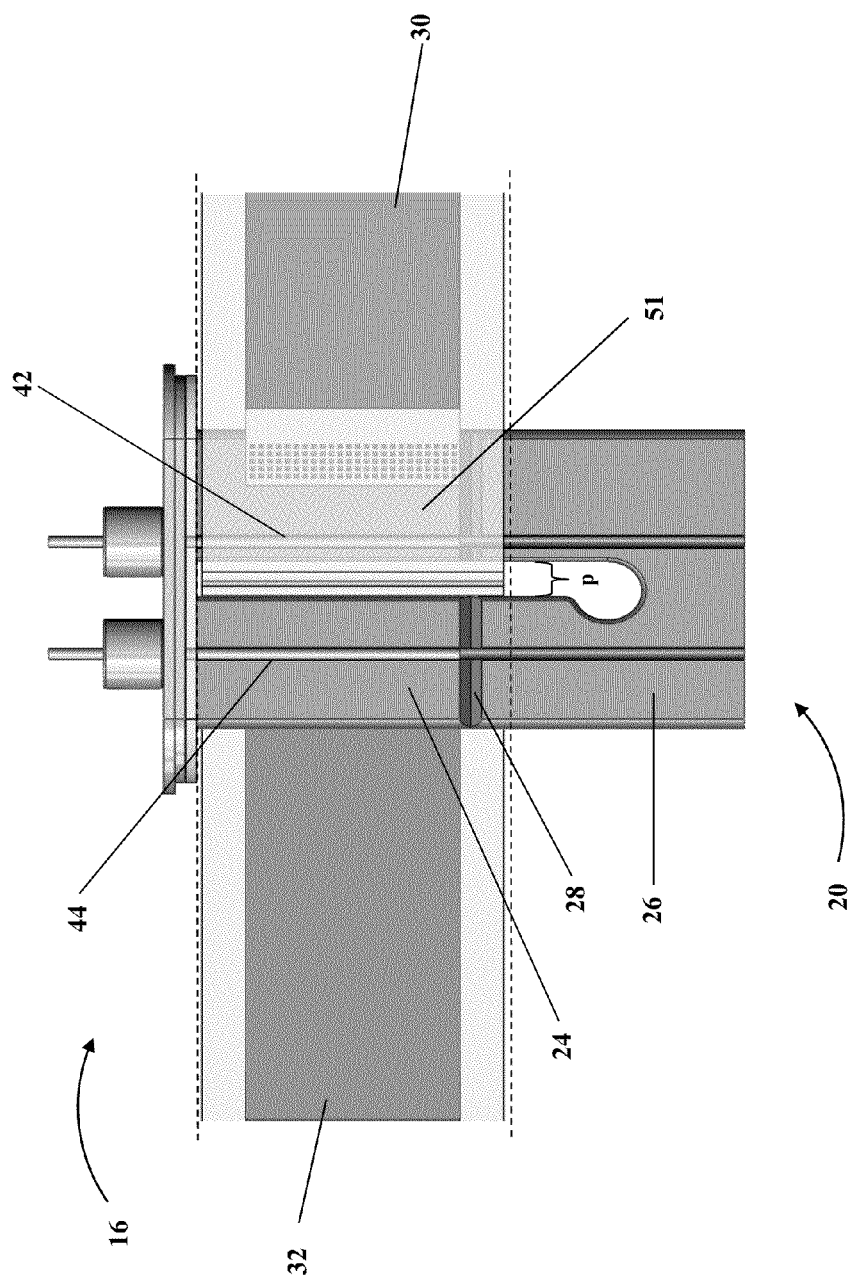
FIG. 1 is a schematic diagram of one embodiment of an electrode assembly made using a mandrel according to the invention. In this embodiment, the feedthrough pins are on the same side face of the mandrel.

It must be noted that as used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

As used herein, the term "mandrel" means an interior core at least a portion of which can be an integral part of the electrode assembly. The term "interconnect joint" refers to a conductive connection between the electrical components of a battery including a mandrel. While the mandrel may, itself not be conductive, those parts of the electrode assembly required for an electric current, including, at least, positive and negative electrodes and positive and negative feedthrough pins are conductively connected on the mandrel. In addition, the term "electrode" is used to refer to an electrode substrate that can be coated with an active material. The electrode can include a current collecting substrate in the form of multiple "plates" or panels conductively connected to each other. Alternatively, the electrode comprises a substrate in the form of a strip of thin conductive material such as a foil. When the electrode is formed using a foil or thin conductive strip as a substrate, the electrode can be considered an "electrode strip".

As used herein the terms "heat sealed" and "heat sealer" refer to conventional methods known in the art in which a machine applies heat to seal a material such as a thermoplastic material. Of the several types of heat sealers, one is a continuous heat sealer that applies a continuous heat. A continuous heat device or sealer can be constructed using a cartridge heater that is inserted into an appropriate size opening in a block, such as metal or ceramic, having a predetermined shape and desirable thermal properties. A second type of heat sealer is an impulse heat sealer. Generally, an impulse heat sealer uses a stationary element (such as a nichrome wire) that is heated by passing a current through it for a period of time.

The invention and the various features and advantageous details thereof are explained more fully with reference to the non-limiting embodiments that are illustrated in the accompanying drawings and detailed in the following description. Descriptions of well known components and processing techniques are omitted so as not to unnecessarily obscure the invention in detail but such descriptions are, nonetheless, included in the disclosure by incorporation by reference of the citations discussed. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The Invention

The present invention provides a mandrel useful in making a jelly roll electrode assembly and an electric storage battery. The mandrel includes a positive portion, a negative portion and one or more removable portions adjacent to the positive and/or negative portion(s). A passage is provided between the positive and negative portions. The mandrel can be planar having two faces with a groove on each of the positive and negative portions. The grooves can be on the same or opposite faces of the mandrel. The grooves are dimensioned to accommodate positive and negative feedthrough pins.

The positive and negative electrodes and the positive and negative feedthrough pins can be conductively connected to the mandrel when used to make an electrode assembly. One or more separators can be used to insulate the electrodes. For example, a separator can be passed through the passage of the mandrel so as to be juxtaposed alongside both the positive and negative electrodes. The removable portion(s) can be used as a handle to rotate mandrel, electrodes and one or more separators. Rotation of the mandrel wraps the electrodes and one or more separators around the mandrel to provide a jelly roll electrode assembly. The jelly roll assembly can be secured by heat sealing one or more protruding ends of the one or more separators with heat.

Referring now to FIG. 1, one embodiment of an electrode assembly according to the invention is illustrated. FIG. 1 illustrates an electrode assembly 16 including a conductive mandrel 20 having a positive portion (obscured by separator 51) and a negative portion 24, positive and negative electrodes 30 and 32 and positive and negative feedthrough pins 42 and 44. Mandrel 20 further includes removable portion 26 and a removable incision 28. As illustrated, positive electrode 30 and negative electrode 32 can be conductively connected to the conductive mandrel 20 on opposite faces while feedthrough pins 42 and 44 can be conductively connected in place on the same face of the mandrel thereby creating the interconnect joint. In the embodiment shown, positive electrode 30 and the negative electrode 32 can be conductively connected by welding electrodes 30 and 32 to a flat surface of the mandrel 20. In this embodiment, a single separator 51 can be interwoven between positive and negative portions 22 and 24 of mandrel 20 through passage "p" to provide electrode assembly 16.

It should be appreciated that the mandrel can be formed of any conductive material. For example, the mandrel can be formed of stainless steel or aluminum. Alternatively, the mandrel can be made from pure titanium or titanium alloy such as grade 5 or grade 23, nickel, copper and combinations thereof.

While the mandrel can be made using any appropriate process, in one aspect the mandrel can be made using electric discharge machining (EDM). Alternatively, the mandrel can be made by metal extrusion or by injection molding depending on the needs of the battery and the composition of the mandrel. The grooves for the feedthrough pins can be made in the mandrel by machining, etching, or other suitable methods to provide a groove.

The width of mandrel 20 can be from about 0.2 to about 0.5 inches, more particularly from about 0.25 to about 0.4 inches and most particularly from about 0.3 to about 0.35 inches. Generally, the length of the mandrel ranges from about 0.5 inches to about 1 inch, more particularly from about 0.6 to about 0.8 inches and most particularly from about 0.7 to about 0.75 inches. The thickness of the mandrel ranges from about 0.01 to about 0.05 inches, more particularly from about 0.015 inches to about 0.03 inches and most particularly from about 0.02 to about 0.025 inches.

Those of skill in the art will appreciate grooves 23 and 25 should be appropriately sized to accommodate the diameters of the feedthrough pins. The grooves can be in the shape of, for example, a "v", a rounded groove, or a square bottomed groove.

Electrodes 30 and 32 can vary in size, shape and length. Generally the electrode can be a foil or other thin malleable conductive substrate. In various embodiments, the foil can be in the form of a metal foil such as, for example, aluminum, steel, silver, copper, nickel, titanium, etc. The length of the electrodes can range from about 2 inches to about 20 inches, particularly from about 4 inches to about 18 inches and most particularly from about 6 inches to about 16 inches. The width of the electrodes can range from about 0.1 to about 2 inches, more particularly from about 0.2 to about 1.75 inches and most particularly from about 0.3 to about 1.5 inches. The thickness of the electrodes can vary from about 0.003 inches to about 0.04 inches, in particular from about 0.004 to about 0.03 inches and most particularly from about 0.005 to about 0.025 inches.

The electrodes can vary in composition depending on the battery chemistry being used and the mandrel can be optimized for such.

Suitable separator material can be any non-conductive material such as polyethylene, polypropylene and layered combinations thereof. The separator generally has a larger width and length than the electrode(s) it covers so as to fully encase the electrode(s). Suitable separators have a length of from about 4 inches to about 36 inches, in particular from about 8 inches to about 34 inches and most particularly from about 12 inches to about 30 inches and widths of from about 0.2 inches to about 2 inches, in particular from about 0.3 inches to about 1.75 inches and most particularly from about 0.4 inches to about 1.5 inches. Suitable thicknesses for separators range from about 0.0008 inches to about 0.004 inches. Generally, separator 51 can be sized appropriately to extend beyond the bottom portion of positive and negative portions 30 and 32 after removal of removable portion 26.

Feedthrough pins can be sized to fit within the grooves and can be made of any electrically conductive material. For example, feedthrough pins 42 and 44 can be made of steel, platinum, aluminum and titanium, etc. In some embodiments, the feedthrough pins can be made of an alloy such as, for example, platinum-iridium such as 90Pt/10Ir. The length of the positive and negative feedthrough pins can range from about 0.4 to about 1 inches in length, more particularly from about 0.5 to about 0.75 inches and most particularly from about 0.5 to about 0.7 inches. The diameter of the feedthrough pins can vary and can be from about 0.050 to about 0.3 inches, in particular from about 0.01 to about 0.025 inches and most particularly from about 0.01 to about 0.015 inches. The feedthrough pins extend outside of the battery case and can be cut to length as required.

The phrase "removable portion" refers to a portion of the mandrel that can be detached from the remainder of the mandrel. This can be accomplished by scoring a groove deep enough to allow the portion to be "snapped off" from the remainder of the mandrel. Alternatively, the removal portion can be detached by cutting, breaking, tearing or clipping the portion from the remainder of the mandrel.

FIGS. 2A and 2B illustrate a mandrel according to the exemplary embodiment of the invention illustrated in FIG. 1. The mandrel 20 is planar having two faces. The mandrel 20 has a positive portion 22 and a negative portion 24 with "p" separating the two portions. In addition, the mandrel 20 also has a removable portion 26 and a removable incision 28. Also shown are positive feedthrough groove 23 and negative feedthrough groove 25.

FIG. 2B is a top-plan view of mandrel 20 showing the mid-line of mandrel 20, along line 'm-m'. As illustrated in FIG. 2B, feedthrough grooves 23 and 25 are dimensioned and configured to accept feedthrough pins 42 and 44 (FIG. 1). In the embodiment illustrated in FIGS. 2A and 2B, positive feedthrough groove 23 is placed closer to midline 'm-m' of mandrel 20 than negative feedthrough groove 25. This is illustrated by the distance 'd' from positive electrode groove 23 to the midline compared to the distance 'd1' from the negative electrode groove 25 to the midline 'm-m'. Of course, those of skill in the art will appreciate that the placement of the grooves can be equidistant from the midline. Alternatively, the negative feedthrough groove can be closer to the mid-line, if desired, or the grooves can be placed at any convenient location of the mandrel 20 as needed. However, those of skill in the art will appreciate that by having the feedthrough pins positioned at two different distances from the midline, a battery cover (not shown) can be constructed to fit over the electrodes (not shown) in only one position. This assures that the terminals can be easily identifiable as positive and negative.

Further, as shown in FIG. 2A, removable portion 26 can be separated from positive portion 22 and negative portion 24 by removable incision 28. Removable incision 28 can be deep enough such that mandrel 20 can be broken along the incision 28. This results in individual positive and negative portions 22 and 24 of mandrel 20. Also illustrated in FIG. 2A is an orientation notch 29 shown as a foot-type aperture on the midline of mandrel 20. In the embodiment shown, the "foot" points toward negative portion 24 of mandrel 20. Those of skill in the art will realize that such orientation guides are not necessary for mandrel 20 to function nor do they have to point towards the negative portion of the mandrel. However, such guides are helpful if consistently used.

Figure 3:
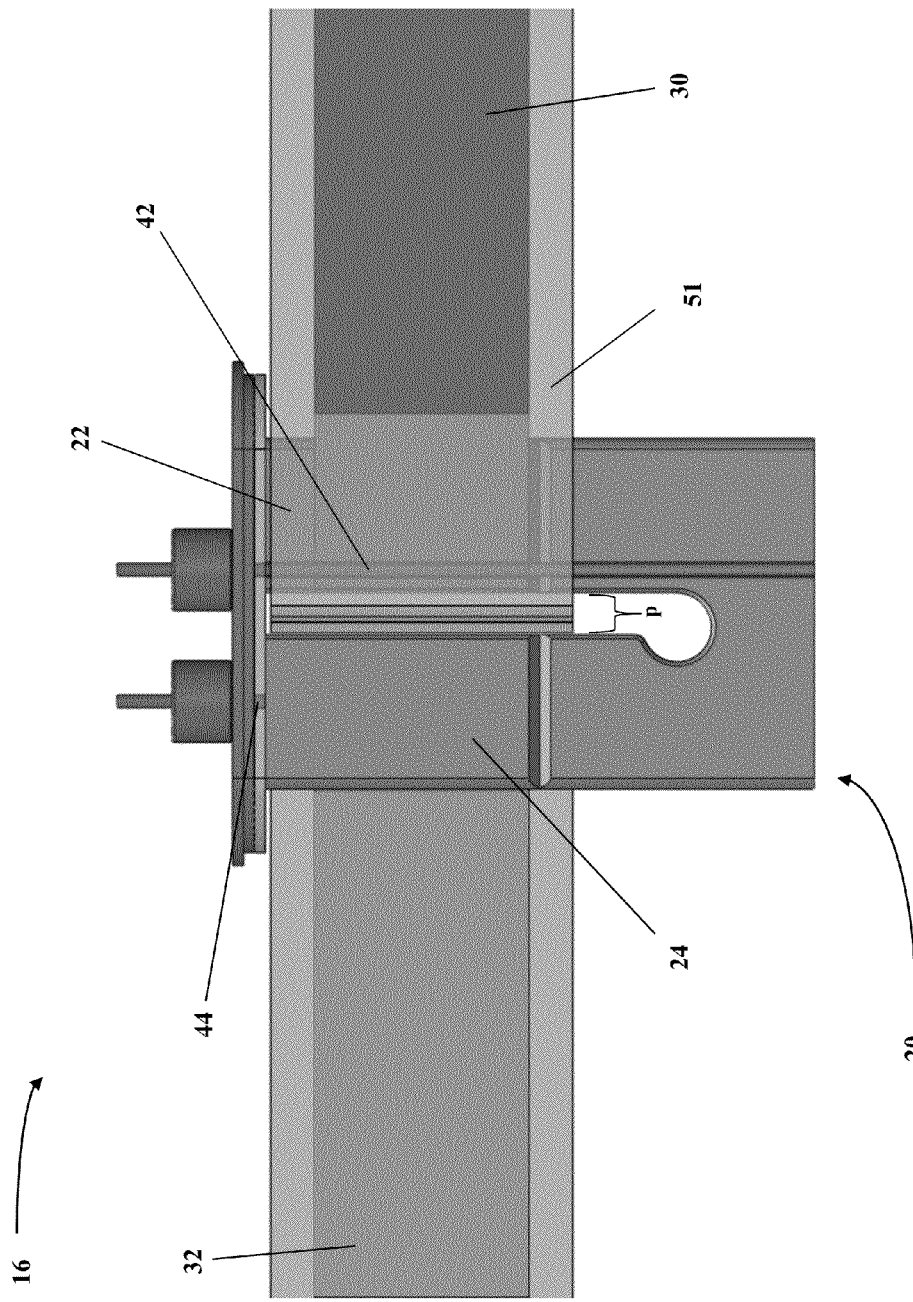
FIG. 3 is a schematic diagram of an electrode assembly made using another embodiment of the mandrel according to the invention. In this embodiment, the feed through pins are on opposite faces of the mandrel.

FIG. 3 shows another embodiment of an interconnect joint for an electrode assembly 16 according to the invention. In this embodiment, grooves for positive and negative feedthrough pins 42 and 44 are on opposite faces of mandrel 20. FIG. 3 also illustrates the conductive connection between mandrel 20, positive and negative feedthrough pins 42 and 44 and positive and negative electrodes 30 and 32. Positive and negative electrodes 30 and 32 are interposed between positive and negative feedthrough pins 42 and 44 in grooves on positive and negative portions 22 and 24 of mandrel 20. In some embodiments, the connection can be secured by welding both feedthrough pins 42 and 44 and electrodes 30 and 32 into the grooves.

Those of skill in the art will appreciate that when the electrodes can be conductively connected directly to the feedthrough pins, the mandrel does not need to be conductive to establish the conductive interconnect joint. Therefore, in those embodiments of the invention where the mandrel does not need to be electrically conductive to complete the interconnect joint, the mandrel can be made from a non-electrically conductive material. Suitable electrically non-conductive materials can include polymers including polypropylene, polyethylene, and poly(ethylene-co-tetrafluoroethylene) (ETFE). Advantageously, the separator(s) can be heat sealed to the mandrel when the mandrel is prepared from a non-electrically conductive material. For example, an end of the separator can be attached to a portion of the mandrel via heat sealing.

Figure 4:
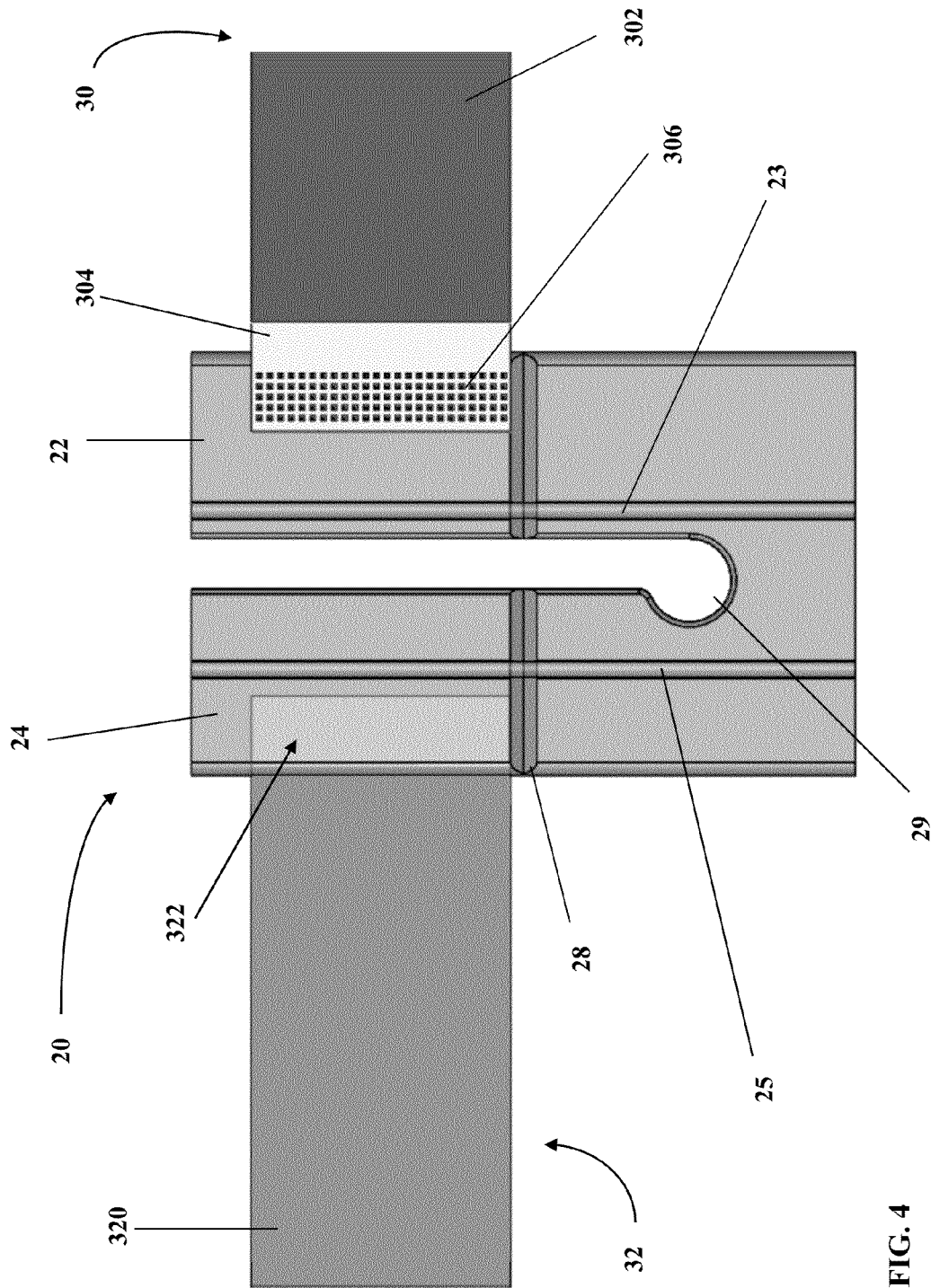
FIG. 4 is a schematic diagram of the mandrel illustrated in FIG. 1 with electrodes attached to the positive portion and the negative portion of the mandrel.

FIG. 4 is a schematic diagram illustrating mandrel 20 with electrodes 30 and 32 conductively connected to positive and negative portions 22 and 24. Electrodes 30 and 32 can be attached to opposite faces of mandrel 20.

Positive electrode 30 can be coated with a positive active material 302. As illustrated, positive electrode 30 has a proximal end 304 that is not coated with active material. Proximal end 304 can be attached at 306 to positive portion 22 of mandrel 20. Similarly, negative electrode 32 can be coated with a negative active material 320. Proximal end 322 of negative electrode 21 is not coated with active material and facilitates attachment (not shown) to the negative portion 24 of mandrel 20. Electrodes 30 and 32 can be attached to the mandrel by welding such as, for example, laser welding, ultrasonic welding or resistance welding. In one embodiment, a combination of two or more welds can be included at the electrode and mandrel interface to effect attachment.

Those of skill in the art will appreciate that positive active material 302 can be any of those materials used as such in electrode technology. For example, positive active material 302 can be lithium cobalt oxide (rechargeable), carbon monofluoride ($CF_x$), silver vanadium oxide (primary), or combinations thereof. Similarly, negative active material 320 can be any appropriate negative active material used in electrode technology. Exemplary materials include lithium titanate, artificial graphite powder (MCMB), lithium, or combinations thereof.

Both positive 30 and negative electrodes 32 can be coated on one side or both sides of the electrode to provide an electron flow suitable to generate a current. However, those of skill in the art will appreciate that coating of the electrodes on both sides with active material allows for more efficient use of the two sides of the electrodes, resulting in increased energy and power in contrast to a single side coated electrode. It should be understood that the proximal and/or distal ends of the electrodes do not need to be coated on one or both sides. It should be appreciated that any suitable combination of coatings and coated portions of the electrode(s) is within the scope of the invention and is not limiting.

Figure 5:
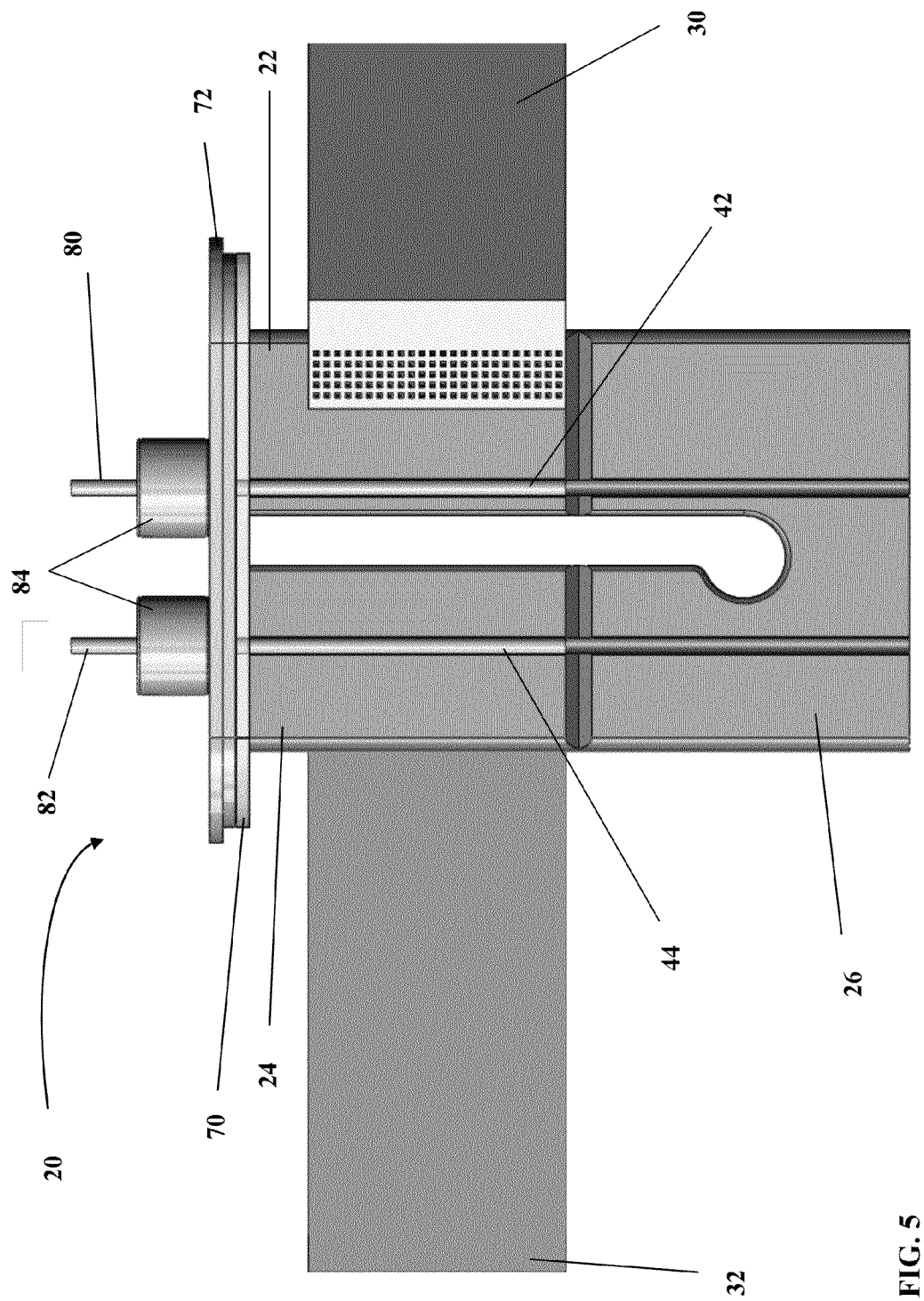
FIG. 5 is a schematic diagram of the mandrel shown in FIG. 4 with positive and negative feedthrough pins attached and a battery cap and insulator.

FIG. 5 illustrates electrodes 30 and 32 connected to mandrel 20, as shown in FIG. 4. Positive and negative feedthrough pins 42 and 44 can be placed in grooves 23 and 25 and secured in place. Feed through pins 42 and 44 and their respective electrodes 30 and 32 can be conductively connected to mandrel 20 by welding. Alternatively, a direct conductive connection between the electrode and the feedthrough pin can be made by attaching either or both positive electrode 30 and negative electrode 32 in grooves 23 and 25 underneath feedthrough pins 42 and 44 respectively. As illustrated in FIG.

5, feedthrough pins 42 and 44 extend through insulator 70 and battery cover 72 and can be used as battery terminals 80 and 82. Also shown are ferrules 84 which are welded to battery cover 72 to stabilize the terminals and isolate them from battery cover 72. A glass seal or sleeve (not shown) can be placed over the feedthrough pin prior to the placement of ferrule 84 to provide a seal between the feedthrough pin and the battery cover and insulating ferrule 84 from the feedthrough pin.

Suitable materials for ferrule construction can be titanium, titanium alloys or stainless steel.

Insulator 70 can be made of any insulating material such as, for example, polyethylene, polypropylene, polyethylene terephthalate, polyimide, ethylene/tetrafluoroethylene copolymer (ETFE). In one aspect, the insulating material can be a non-conductive film such as, for example, DuPont Kapton® polyimide film.

In those embodiments where feedthrough pins 42 and 44 and electrodes 30 and 32 can be directly connected to each other in the feedthrough grooves 23 and 25, the mandrel 20 need not be electrically conductive to complete the interconnect joint. This is because direct connection of the electrodes to the feedthrough pins provides an electrical conduction between the electrodes, the feedthrough pins and battery terminals.

Those of skill in the art can appreciate that under the above described conditions the battery case will be neutral. However, in other embodiments, a stud pin (not shown) can be welded to the battery cover concentric with the position one of the feedthrough pins 42 or 44. Thus, in this embodiment, the case will be at either a negative potential or a positive potential depending at which position the stud pin is secured.

Figure 2:
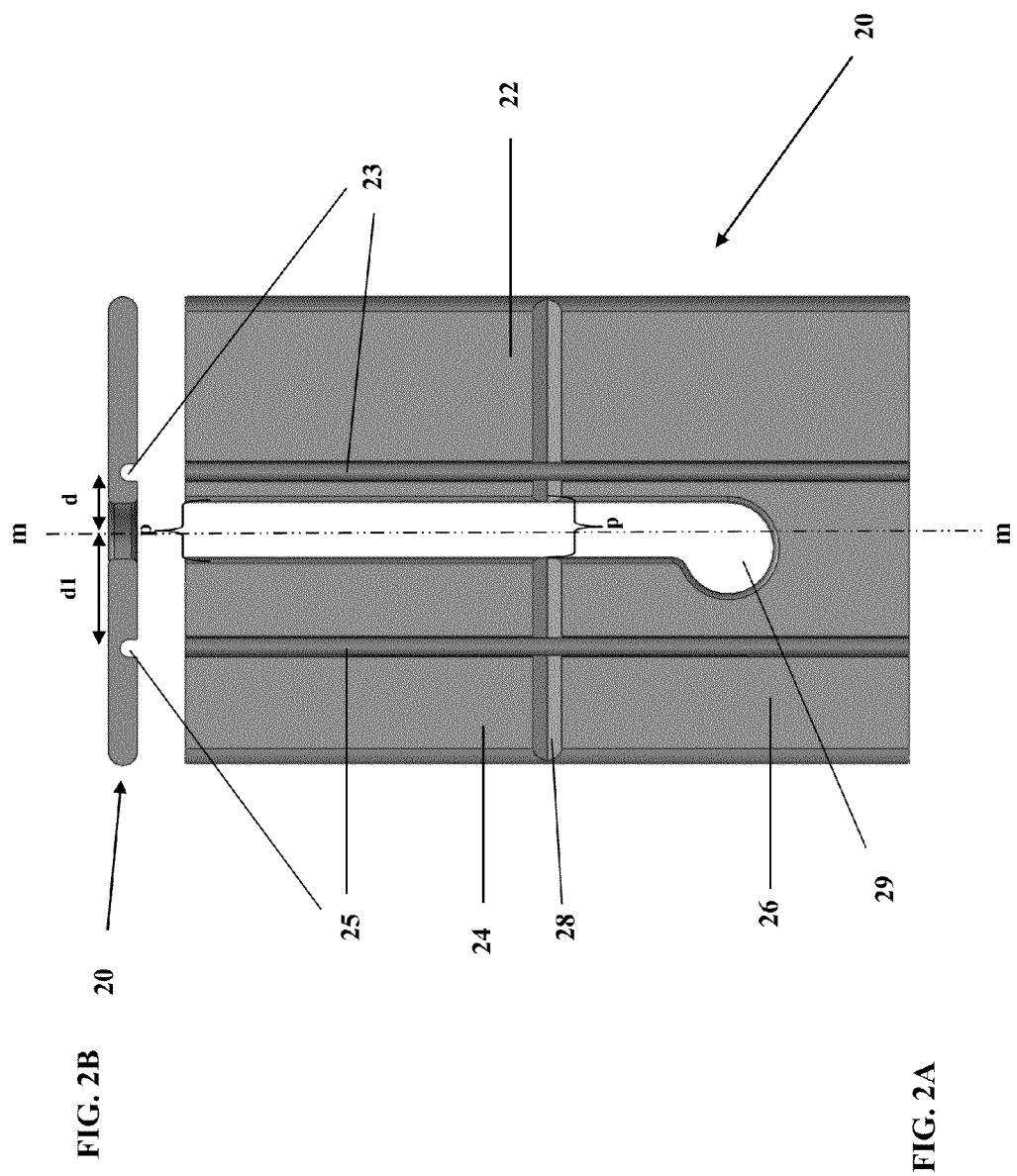
FIGS. 2A and 2B illustrate a mandrel according to the embodiment of the invention illustrated in FIG. 1.
Figure 6:
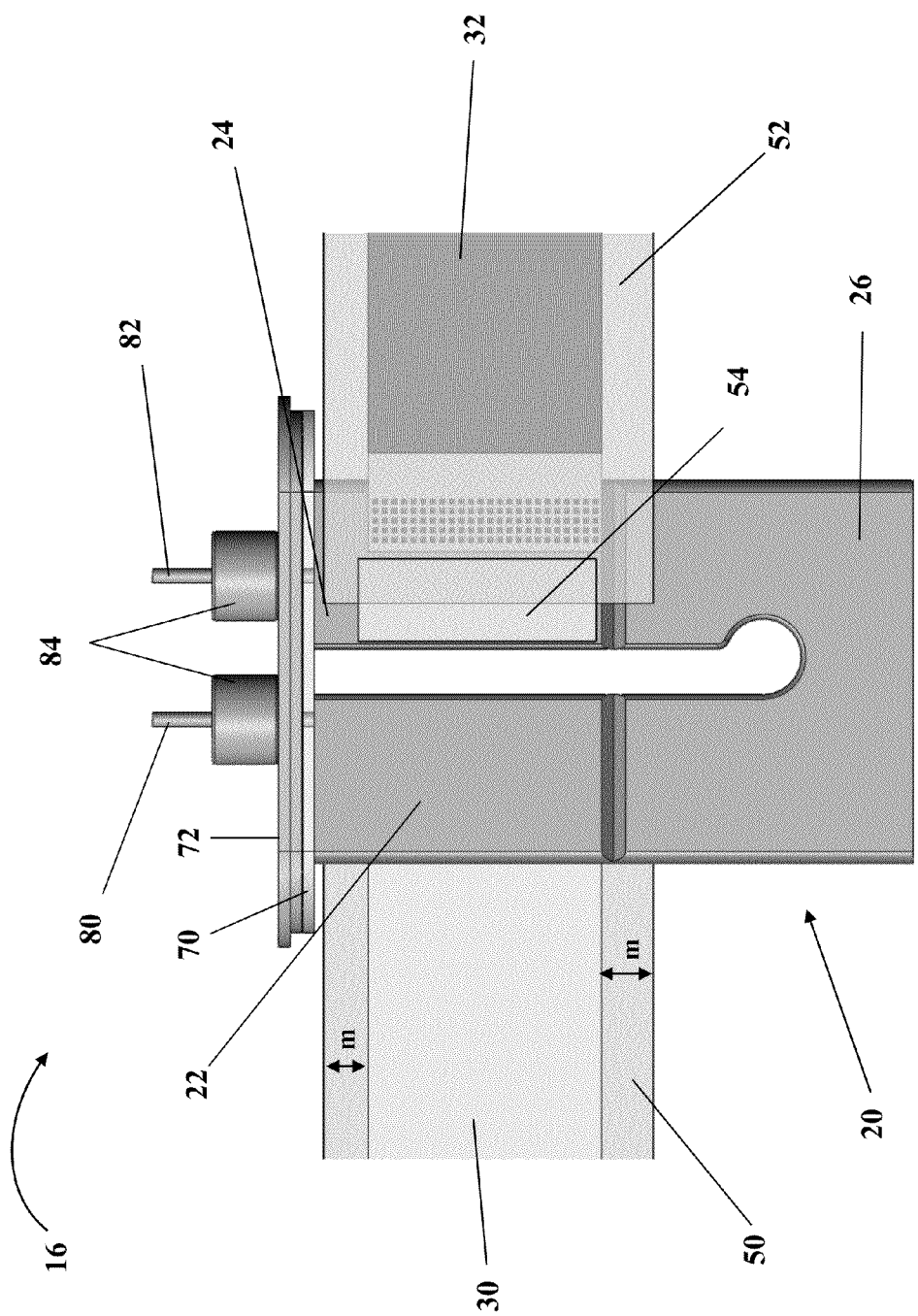
FIG. 6 illustrates the embodiment of a completed electrode assembly using the mandrel shown in FIG. 4 and with two separators attached. The view shown in FIG. 6 is from the opposite face as the view from FIG. 5.

FIG. 6 illustrates an electrode assembly as shown in FIG. 2 but viewed from the opposite face. In this embodiment, the electrode assembly has a first separator 50 and a second separator 52 attached to mandrel 20. As shown, first separator 50 and second separator 52 can be attached so as to be opposed to positive electrode 30 and negative electrode 32 respectively. When wound, separators 50 and 52 isolate positive and negative electrodes 30 and 32 from each other (shown in FIG. 7A). The separators can be attached to the mandrel 20 using any effective method. For example, the separators can be connected by adhesive or tape 54 that adheres the separator to the mandrel. Tape material 54 can be a polypropylene, polyethylene, polyester, or nylon resin. Adhesives include, for example, polyvinylidenefluoride (PVDF), co-polymers of polyhexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon and mixtures thereof.

FIG. 6 also shows that, as with the single separator 51 used in the embodiments shown in FIGS. 1 and 3, separators 50 and 52 are wider than electrodes 30 and 32 by a distance 'm'. Those of skill in the art will appreciate that, during the process of winding the electrode assembly, some telescoping of electrodes 30 and 32 may occur. Use of separators 50 and 52 that are wider than electrodes 30 and 32 helps to ensure that the electrodes do not contact each other in the jelly roll.

FIGS. 7A-7D are schematic, top-plan views of four separate embodiments of coiled jelly roll assemblies providing an interconnect joint according to the invention. FIG. 7A shows mandrel 20 having positive and negative feedthrough pins 42 and 44 on the same face with electrodes 30 and 32 connected on opposite faces of the mandrel 20. Uncoated portions of 304 and 322 of electrodes 30 and 32 can be connected to positive 22 and negative 24 portions of mandrel 20. Two separators 50 and 52 can be used to separate electrodes 30 and 32.

FIG. 7B provides an embodiment of the invention where positive and negative feedthrough pins 42 and 44 are on opposite faces of the mandrel. Uncoated portions of 304 and 322 of positive and negative electrodes 30 and 32 can be conductively connected to feedthrough pins 42 and 44. Uncoated portions 304 and 322 can be positioned behind feedthrough pins 42 and 44 in the feedthrough grooves. Two separators, 50 and 52, are shown in FIG. 7B.

Once the components of the electrode assembly 16 are assembled, mandrel 20 can be rotated to wind electrodes 30 and 32 and separators 50 and 52 around mandrel 20 to create the jelly roll electrode assembly 16 as shown in FIGS. 7A and 7B. FIGS. 7A and 7B also illustrate mandrel 20 integrated into the center of the jelly roll electrode assembly 16 and separators 50 and 52 wound between the positive and negative electrodes 30 and 32 respectively.

FIGS. 7C and 7D are schematic diagrams of jelly roll assemblies incorporating an interconnect joint using a single separator. FIGS. 7C and 7D illustrate separator 51 woven between positive and negative portions 22 and 24 of mandrel 20 to insulate positive 30 and negative 32 electrodes. FIG. 7C shows one embodiment of the interconnect joint wherein positive and negative feedthrough pins 42 and 44 can be on the same face of the mandrel 20. Uncoated portions 304 and 322 can be conductively connected to opposite faces of the mandrel 20 with separator 51 passing through passage 'p' (FIG. 3) of mandrel 20. FIG. 7D shows the interconnect joint where positive and negative feedthrough pins 42 and 44 can be on different faces of the mandrel 20. Uncoated portions 304 and 322 can be conductively connected to feedthrough pins 42 and 44 by positioning them in the feedthrough grooves behind feedthrough pins 42 and 44.

As illustrated in FIGS. 7C and 7D, once the components of electrode assembly 16 are assembled, mandrel 20 can be rotated to wind the electrodes 30 and 32 and the single interwoven separator 51 around the mandrel to create the jelly roll electrode assembly 16. FIGS. 7C and 7D also illustrate mandrel 20 integrated into the center of the jelly roll electrode assembly 16 with separator 51 wound between the positive and negative electrodes 30 and 32 respectively.

Those of skill in the art will appreciate that, by positioning a single separator 51 through passage "p", the tension of the jelly roll maintains the separator 51 in place. The jelly roll can be wound with a desired tension without risk of the separator becoming dislodged from its position. In addition, those of skill in the art will further appreciate that, by use of the interconnect joint, whether a single separator is used or two different separators are used, there is no need for the placement of extraneous tabs to act as electrode terminals. The interconnect joint results in the ends of the feedthrough pins 42 and 44 being usable as positive and negative battery terminals 80 and 82. Therefore, extraneous tabs are not present that could damage the coiled jelly roll.

Rotating the mandrel to coil the jelly roll assembly can be accomplished by using the removable portion 26. Rotating the mandrel to wind or coil the jelly roll assembly can be performed manually. Alternatively, the process can be automated. For example, the removable portion 26 of mandrel 20 can be attached to a ligature or other holding mechanism (not shown) which can be turned by a motor. The mandrel 20 can be rotated and the process of coiling the jelly roll assembly 16 can be automated. Once wound, those of skill in the art will appreciate that any suitable means can be used to keep the electrodes in place once rolled. For example, simple insulating tape can be used such as, for example, Teflon, or polyimide tape such as, for example, DuPont Kapton®.

Figures 8A, 8B:
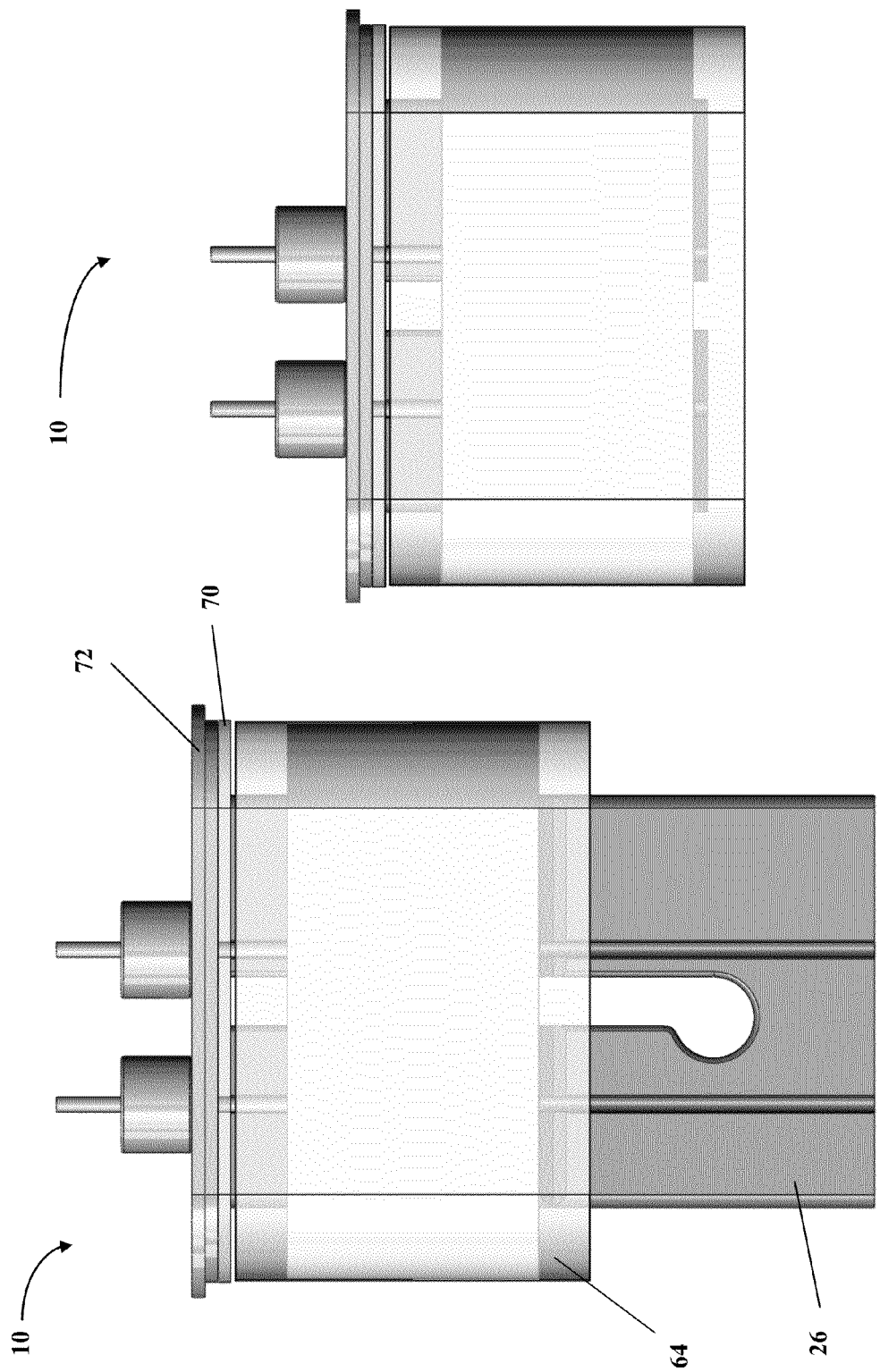
FIGS. 8A and 8B show a battery made using the coiled electrode assembly made using a mandrel according to the invention.

FIG. 8A shows the electrode assembly in battery case 64 before removable portion 26 is detached. As illustrated, battery case 64 is dimensioned so as to approximate the size of the mandrel without removable portion 26. As shown in FIG. 8B, separation of the removable portion results in individual positive portion 22 and negative portion 24 of mandrel 20 integrated into the jelly roll assembly 16 and battery 10. Jelly roll assembly 16 fits within battery case 64 as illustrated in FIG. 8B. Because positive portion 22 and negative portion 24 are not removed from the electrode assembly 16, telescoping of the jelly roll assembly due to their removal can be minimized or eliminated. Therefore, the jelly roll can be wound or coiled to a tension desired to accommodate the battery rather than coiling the jelly roll to a tension that allows the mandrel to be removed from the coil. Thus, the instant invention provides a less bulky electrode assembly and, consequently, can be used to provide a smaller battery.

Figure 9:
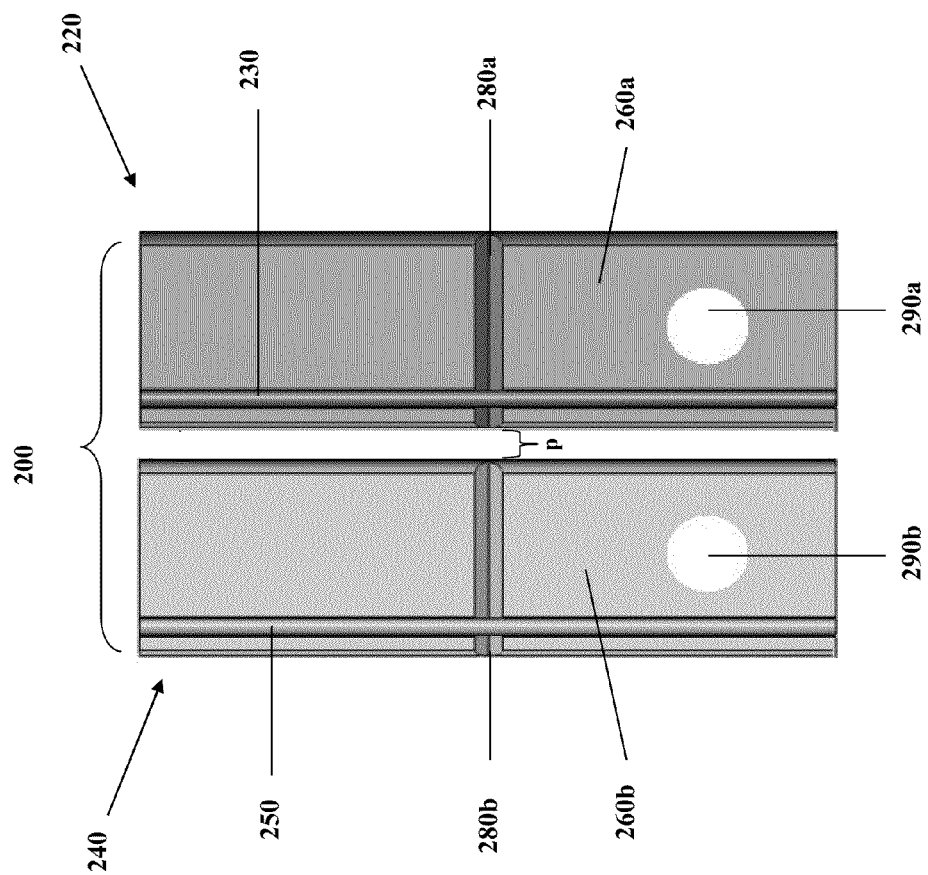
FIG. 9 is a schematic diagram of another embodiment of the mandrel according to the invention having two separate positive and negative portions, each with its own removable portion.

FIG. 9 illustrates a mandrel 200 according to the invention. Mandrel 200 includes a positive portion 220 and a negative portion 240. Both the positive portion 220 and the negative portion 240 include removable portions 260a and 260b, respectively. Positive portion 220 further includes a positive feedthrough groove 230 while the negative portion includes a negative feedthrough groove 250. As illustrated in FIG. 8, a removable incision 280a and 280b delineates the removable portion 260a and 260b from positive portion 220 and negative portion 240 of mandrel 200. Orientation notches 290a and 290b can be provided in removable portion 260a and 260b, respectively, of positive portion 220 and negative portion 240 of mandrel 200.

It should be understood that positive and negative electrodes (not shown) and feedthrough pins (not shown) can be attached to the positive and negative portions 200 and 240 of mandrel 200 as previously described herein. Additionally, it should be understood that feedthrough grooves 230 and 250 can be positioned on opposite sides of mandrel 200.

Two separators (not shown) can be attached to positive and negative portions 220 and 240 of mandrel 200 also as previously described. Alternatively, a single separator can be passed through passage "p" also as previously described to afford an electrode assembly.

During assembly, positive portion 220 and negative portion 240 can be held in place, for example, by a vice and grip winding ligature (not shown) connected to the removable portions 260a and 260b. As with the mandrel illustrated in FIG. 7B, once the jelly roll is coiled, the removable portions can be detached. Those of skill in the art will appreciate that the mandrel shown in FIG. 8 allows each positive portion 220 and negative portion 240 to be fabricated from different materials as needed, thereby optimizing the battery and battery chemistry for a desired use.

Figure 12:
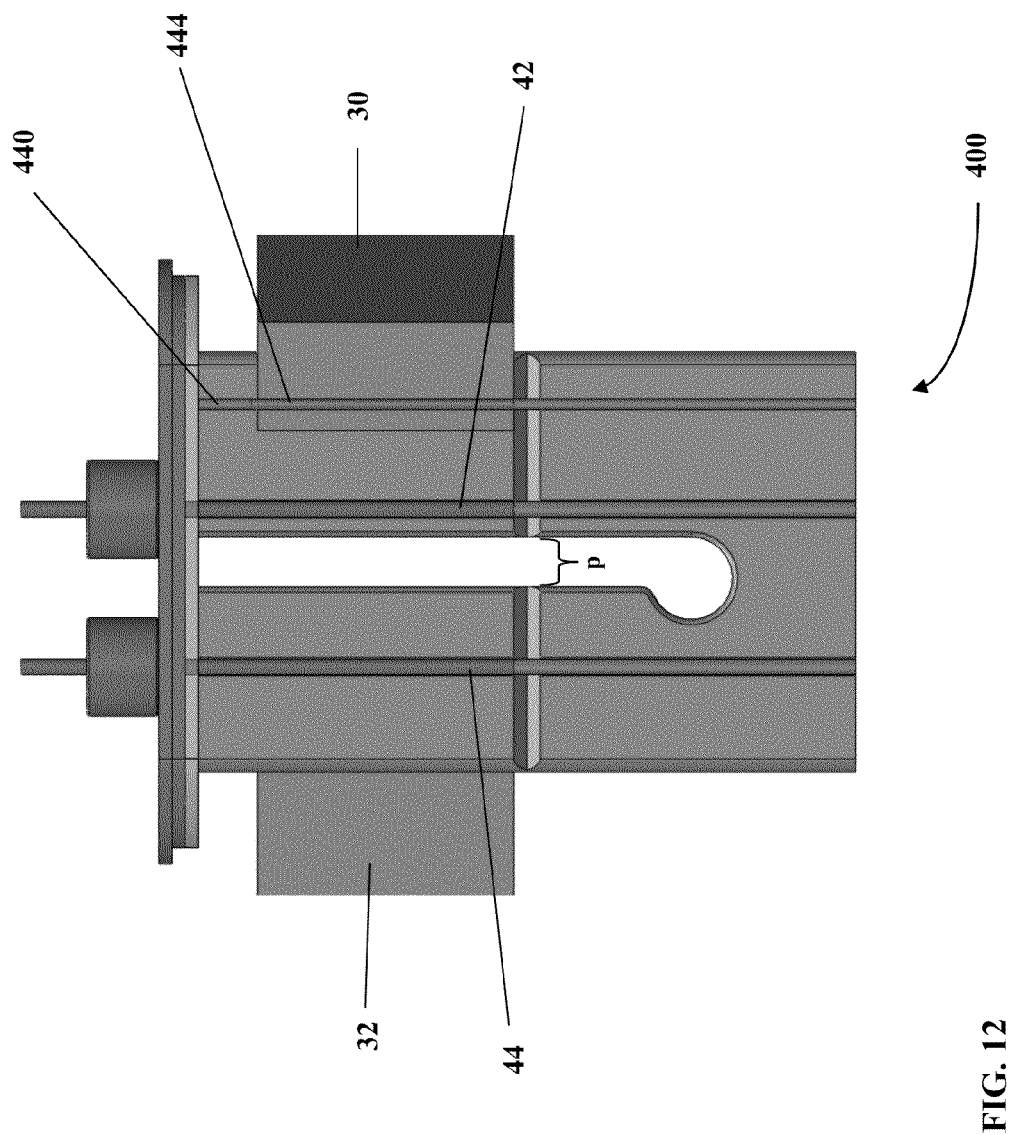
FIG. 12 is a side-plan view of a partially assembled electrode assembly according to one embodiment of the invention using the mandrel shown in FIGS. 10A and 10B.

FIGS. 10A and 10B illustrate another mandrel 300 according to the invention. FIG. 10A is a side-plan view showing a mandrel 300 with grooves 340 and 342 designed and configured for securing a stud pin (not shown) to the mandrel 300. Mandrel 300 also includes grooves 323 and 325 designed and configured to accept positive and negative feedthrough pins (not shown). Electrodes 30 and 32 (not shown) can be secured to mandrel 300 by stud pins (as shown in FIG. 12). For example, electrodes 30 and 32 can be placed into grooves 340 and 342. A stud pin can then be placed over the electrode and secured into the groove to effect attachment between positive portion 321 and negative portion 324 of mandrel 300. Stud pins can be made of any conductive or non-conductive material. As illustrated in FIGS. 10A and 10B, stud pin grooves 340 and 342 can be located on opposite faces of the mandrel. As with mandrel 20, illustrated in FIG. 2, mandrel 300 includes a positive portion 321, a negative portion 324 and a removable portion 326. Positive and negative portions 321 and 324 are adjacent to removable incision 328. Mandrel 300 also has positive and negative feedthrough grooves 323 and 325 dimensioned and configured to accept positive and negative feedthrough pins (not shown). In this embodiment, the grooves 323 and 325 are on opposite faces of the mandrel.

Positive and negative electrodes (not shown) and feedthrough pins (not shown) can be attached to the positive and negative portions 321 and 324 of mandrel 300 as previously described herein. Two separators (also not shown) can be attached to positive and negative portions 321 and 324 of mandrel 300 also as previously described. Alternatively, a single separator can be passed through passage "p" also as previously described to afford an electrode assembly.

FIGS. 11A and 11B illustrate another mandrel according to the invention. Mandrel 400 includes a positive portion 422, a negative portion 424 and a removable portion 426. Positive and negative portions 422 and 424 are adjacent to removable incision 428. As with mandrel 300, illustrated in FIGS. 10A and 10B, mandrel 400 is designed and configured for the electrodes (not shown) to be attached to mandrel 400 using a stud pin (444 shown in FIG. 12). As shown in FIG. 11A, mandrel 400 provides for positive stud pin groove 440, positive feedthrough pin groove 423 and negative feed through pin groove 425 to be on the same face of mandrel 400 while negative stud pin groove 442 is on the opposite face of the mandrel.

As with FIGS. 9, 10A and 10B, positive and negative electrodes (not shown) and feedthrough pins (not shown) can be attached to positive and negative portions 422 and 424 of mandrel 400 as previously described herein. Two separators (also not shown) can be attached to positive and negative portions 422 and 424 of mandrel 400 also as previously described. Alternatively, a single separator can be passed through passage "p" also as previously described to afford an electrode assembly.

FIG. 12 is a side-plan view of mandrel 400 (FIGS. 10A and 10B) partially assembled into an electrode assembly. FIG. 12 shows positive electrode 30 anchored underneath stud pin 444 in groove 440. Both electrode 30 and stud pin 444 can be connected to mandrel 400 together in groove 440 to provide conductive attachment of electrode 30 to mandrel 400 and to feedthrough pin 42 to create a conductive interconnect joint. Positive feedthrough pin 42 and negative feedthrough pin 44 are on the same face of the mandrel while negative electrode 32 can be connected to mandrel 400 using a stud pin (not shown) on the opposite face of the mandrel 400.

Two separators (also not shown) can be attached to positive and negative portions 422 and 424 of mandrel 400 also as previously described. Alternatively, a single separator can be passed through passage "p" also as previously described to afford an electrode assembly.

In an alternative embodiment, the mandrel can be made from a non-electrically conductive material. Such electrically non-conductive materials can include polymers including polypropylene, polyethylene, and poly(ethylene-co-tetrafluoroethylene) (ETFE). The mandrel can resemble mandrel 20 as illustrated in FIGS. 2A and 2B such that there is a direct electrical connection between the electrodes and the feedthrough pins positioned in the mandrel.

The following paragraphs enumerated consecutively from 1 through 9 provide for various aspects of the present invention. In one embodiment, in a first paragraph (1), the present invention provides a mandrel for an electrode assembly comprising:
- a positive portion, a negative portion and one or more removable portions,
- wherein the positive portion and negative portion are adjacent to and connected to the one or more removable portions; and
- wherein the positive and negative portions are separated by a passage there between.

2. The mandrel of paragraph 1, wherein detachment of the one or more removable portions results in unconnected positive and negative portions.

3. The mandrel of either of paragraphs 1 or 2, wherein the mandrel is formed from an electrically conductive material selected from stainless steel, aluminum, titanium, nickel, copper, or combinations thereof.

4. The mandrel of either of paragraphs 1 or 2, wherein the mandrel is formed from a non-electrically conductive material selected from polypropylene, polyethylene, or poly(ethylene-co-tetrafluoroethylene) (ETFE).

5. The mandrel of any of paragraphs 1 through 4, wherein the positive portion and the negative portion are the same material.

6. The mandrel of any of paragraphs 1 through 4, wherein the positive portion and the negative portion are different materials.

7. The mandrel of any of paragraphs 1 through 6, wherein the mandrel is planar having two faces.

8. The mandrel of any of paragraphs 1 through 7, wherein the positive portion and the negative portion each have feedthrough grooves dimensioned to accept feedthrough pins.

9. The mandrel of any of paragraphs 1 through 8, wherein the feedthrough grooves are on the same face of the mandrel or on opposite faces of the mandrel.

The following paragraphs enumerated consecutively from 1 through 24 provide for various additional aspects of the present invention. In one embodiment, in a first paragraph (1), the present invention provides an electrode assembly comprising:
- a mandrel comprising a positive portion, a negative portion, and one or more removable portions;
- wherein the positive portion and negative portion are adjacent to and connected to the one or more removable portions; and
- wherein the mandrel includes a passage from the first face to the second face dividing the positive and negative portions;
- a positive electrode attached to the positive portion;
- a negative electrode attached to the negative portion;
- a positive feedthrough pin; and
- a negative feedthrough pin;
- wherein the positive portion has a groove configured to accept the positive feedthrough pin and the negative portion has a groove configured to accept the negative feedthrough pin;
- wherein the positive electrode and the positive feedthrough pin are conductively connected to the mandrel on the positive portion; and
- wherein the negative electrode and the negative feedthrough pin are conductively connected to the mandrel on the negative portion.

2. The electrode assembly of paragraph 1, wherein the removable portion connects the positive portion and the negative portion.

3. The electrode assembly of either paragraphs 1 or 2, wherein the positive and negative feedthrough pins are independently selected from steel, platinum, aluminum, titanium, niobium, molybdenum, platinum-iridium, and copper and their alloys.

4. The electrode assembly of any of paragraphs 1 through 3, wherein the positive and negative electrode materials are independently selected from aluminum, steel, silver, copper, nickel, titanium or alloys thereof.

5. The electrode assembly of paragraph 4, wherein the positive electrode is coated with a positive active material selected from lithium cobalt oxide (rechargeable), carbon monofluoride ($CF_x$), silver vanadium oxide (primary), or combinations thereof.

6. The electrode assembly of paragraph 4, wherein the negative electrode is coated with a negative active material selected from lithium titanate, artificial graphite powder (MCMB), lithium or combinations thereof.

7. The electrode assembly of any of paragraphs 1 through 6, wherein the mandrel is formed from an electrically conductive material selected from stainless steel, aluminum, titanium, nickel, copper or combinations thereof.

8. The electrode assembly of any of paragraphs 1 through 6, wherein the mandrel is formed from a non-electrically conductive material selected from polypropylene, polyethylene, or poly(ethylene-co-tetrafluoroethylene) (ETFE).

9. The electrode assembly of any of paragraphs 1 through 8, wherein the positive feedthrough pin is placed in the groove in the positive portion and negative feedthrough pin is placed in the groove in the negative portion.

10. The electrode assembly of any of paragraphs 1 through 9, wherein the positive, the negative electrode, or both is/are interposed in the groove between the positive feedthrough pin or negative feedthrough pin and the mandrel.

11. The electrode assembly of any of paragraphs 1 through 10, wherein the mandrel is planar.

12. The electrode assembly of any of paragraphs 1 through 11, wherein the one of more removable portions are detached.

13. A method of preparing an electrode assembly comprising:
- providing a mandrel comprising a positive portion, a negative portion, and one or more removable portions;
- wherein the positive portion and negative portion are adjacent to and connected to the one or more removable portions; and
- wherein the mandrel includes a passage from the first face to the second face dividing the positive and negative portions;
- providing a positive electrode;
- providing a negative electrode;
- providing a positive feedthrough pin;
- providing a negative feedthrough pin;
- providing a groove on the positive portion configured to accept the positive feedthrough pin;
- providing a groove on the negative portion configured to accept the negative feedthrough pin;
- conductively connecting the positive feedthrough pin and the positive electrode to the positive portion of the mandrel; and
- conductively connecting the negative feedthrough pin and the negative electrode to the negative portion of the mandrel.

14. The method of preparing an electrode assembly of paragraph 13, wherein the removable portion connects the positive portion and the negative portion.

15. The method of preparing an electrode assembly of either paragraphs 13 or 14, wherein the positive and negative feedthrough pins are independently selected from steel, platinum, aluminum, titanium, niobium, molybdenum, platinum-iridium, and copper and their alloys.

16. The method of preparing an electrode assembly of any of paragraphs 13 through 14, wherein the positive and negative electrode materials are independently selected from aluminum, steel, silver, copper, nickel, titanium, or alloys thereof.

17. The method of preparing an electrode assembly of paragraph 16, wherein the positive electrode is coated with a positive active material selected from lithium cobalt oxide (rechargeable), carbon monofluoride ($CF_x$), silver vanadium oxide (primary), or combinations thereof.

18. The method of preparing an electrode assembly of paragraph 16, wherein the negative electrode is coated with a negative active material selected from lithium titanate, artificial graphite powder (MCMB), lithium, or combinations thereof.

19. The method of preparing an electrode assembly of any of paragraphs 13 through 18, wherein the mandrel is formed from an electrically conductive material selected from stainless steel, aluminum, titanium, nickel, copper, or combinations thereof.

20. The method of preparing an electrode assembly of any of paragraphs 13 through 19, wherein the mandrel is formed from a non-electrically conductive material selected from polypropylene, polyethylene, or poly(ethylene-co-tetrafluoroethylene) (ETFE).

21. The method of preparing an electrode assembly of any of paragraphs 13 through 20, further comprising the steps of placing the positive feedthrough pin in the positive portion groove and placing the negative feedthrough pin in the negative portion groove.

22. The method of preparing an electrode assembly of any of paragraphs 13 through 21, wherein the positive electrode, the negative electrode, or both is/are interposed in the groove between the positive feedthrough pin or negative feedthrough pin and the mandrel.

23. The method of preparing an electrode assembly of any of paragraphs 13 through 22, wherein the mandrel is planar.

24. The method of preparing an electrode assembly of any of paragraphs 13 through 23, further comprising the step of detaching the one or more removable portions.

The following paragraphs enumerated consecutively from 1 through 52 provide for various still other aspects of the present invention. In one embodiment, in a first paragraph (1), the present invention provides an electrode assembly comprising:
- a mandrel comprising a positive portion, a negative portion, and one or more removable portions;
- wherein the positive portion and negative portion are adjacent to and connected to the one or more removable portions; and
- wherein the mandrel includes a passage from the first face to the second face dividing the positive and negative portions;
- a positive electrode attached to the positive portion;
- a negative electrode attached to the negative portion;
- a positive feedthrough pin;
- a negative feedthrough pin; and
- a separator
- wherein the positive portion has a groove configured to accept the positive feedthrough pin and the negative portion has a groove configured to accept the negative feedthrough pin;
- wherein the positive electrode and the positive feedthrough pin are conductively connected to the mandrel on the positive portion;
- wherein the negative electrode and the negative feedthrough pin are conductively connected to the mandrel on the negative portion; and
- wherein the separator passes through the passage in the mandrel so as to be interposed to the positive portion on the first face and the negative portion on the second face.

2. The electrode assembly of paragraph 1, wherein the removable portion connects the positive portion and the negative portion.

3. The electrode assembly of either paragraphs 1 or 2, wherein the positive and negative feedthrough pins are independently selected from steel, platinum, aluminum, titanium, niobium, molybdenum, platinum-iridium, copper and their alloys.

4. The electrode assembly of any of paragraphs 1 through 3, wherein the positive and negative electrode materials are independently selected from aluminum, steel, silver, copper, nickel, titanium, or alloys thereof.

5. The electrode assembly of paragraph 4, wherein the positive electrode is coated with a positive active material selected from lithium cobalt oxide (rechargeable), carbon monofluoride ($CF_x$), silver vanadium oxide (primary), or combinations thereof.

6. The electrode assembly of paragraph 4, wherein the negative electrode is coated with a negative active material selected from lithium titanate, artificial graphite powder (MCMB), lithium, or combinations thereof.

7. The electrode assembly of any of paragraphs 1 through 6, wherein the mandrel is formed from an electrically conductive material selected from stainless steel, aluminum, titanium, nickel, copper, or combinations thereof.

8. The electrode assembly of any of paragraphs 1 through 6, wherein the mandrel is formed from a non-electrically conductive material selected from polypropylene, polyethylene, or poly(ethylene-co-tetrafluoroethylene) (ETFE).

9. The electrode assembly of any of paragraphs 1 through 8, wherein the positive feedthrough pin is placed in the groove in the positive portion and negative feedthrough pin is placed in the groove in the negative portion.

10. The electrode assembly of any of paragraphs 1 through 8, wherein the positive electrode, the negative electrode, or both is/are interposed in the groove between the positive feedthrough pin or negative feedthrough pin and the mandrel.

11. The electrode assembly of any of paragraphs 1 through 10, wherein the separator is formed of polyethylene, polypropylene or layered combinations thereof.

12. The electrode assembly of any of paragraphs 1 through 11, wherein the mandrel is planar.

13. The electrode assembly of any of paragraphs 1 through 12, wherein the one or more removable portions are detached.

14. A method of preparing an electrode assembly comprising:
- providing a mandrel comprising a positive portion, a negative portion, and one or more removable portions;
- wherein the positive portion and negative portion are adjacent to and connected to the one or more removable portions; and
- wherein the mandrel includes a passage from the first face to the second face dividing the positive and negative portions;
- providing a positive electrode;
- providing a negative electrode;
- providing a positive feedthrough pin;
- providing a negative feedthrough pin;

providing a groove on the positive portion configured to accept the positive feedthrough pin;
providing a groove on the negative portion configured to accept the negative feedthrough pin;
conductively connecting the positive feedthrough pin and the positive electrode to the positive portion of the mandrel;
conductively connecting the negative feedthrough pin and the negative electrode to the negative portion of the mandrel; and
providing a separator that passes through the passage in the mandrel so as to be interposed to the positive portion on the first face and the negative portion on the second face.

15. The method of preparing an electrode assembly of paragraph 14, wherein the removable portion connects the positive portion and the negative portion.

16. The method of preparing an electrode assembly of either paragraphs 14 or 15, wherein the positive and negative feedthrough pins are independently selected from steel, platinum, aluminum, titanium, niobium, molybdenum, platinum-iridium, and copper and their alloys.

17. The method of preparing an electrode assembly of any of paragraphs 14 through 16, wherein the positive and negative electrode materials are independently selected from aluminum, steel, silver, copper, nickel, titanium or alloys thereof.

18. The method of preparing an electrode assembly of paragraph 17, wherein the positive electrode is coated with a positive active material selected from lithium cobalt oxide (rechargeable), carbon monofluoride ($CF_x$), silver vanadium oxide (primary), and combinations thereof.

19. The method of preparing an electrode assembly of paragraph 17, wherein the negative electrode is coated with a negative active material selected from lithium titanate, artificial graphite powder (MCMB) or lithium.

20. The method of preparing an electrode assembly of any of paragraphs 14 through 19, wherein the mandrel is formed from an electrically conductive material selected from stainless steel, aluminum, titanium, nickel, copper and combinations thereof.

21. The method of preparing an electrode assembly of any of paragraphs 14 through 19, wherein the mandrel is formed from a non-electrically conductive material selected from polypropylene, polyethylene, or poly(ethylene-co-tetrafluoroethylene) (ETFE).

22. The method of preparing an electrode assembly of any of paragraphs 14 through 21, further comprising the steps of placing the positive feedthrough pin in the positive portion groove and placing the negative feedthrough pin in the negative portion groove.

23. The method of preparing an electrode assembly of any of paragraphs 14 through 22, wherein the positive electrode, the negative electrode, or both is/are interposed in the groove between the positive feedthrough pin or negative feedthrough pin and the mandrel.

24. The method of preparing an electrode assembly of any of paragraphs 14 through 23, wherein the mandrel is planar.

25. The method of preparing an electrode assembly of any of paragraphs 14 through 24, further comprising the step of rotating the mandrel about an axis to wind the electrodes and separator around the mandrel.

26. The method of preparing an electrode assembly of any of paragraphs 14 through 25, further comprising the step of detaching the one or more removable portions.

27. An electrode assembly comprising:
a mandrel having two faces and a positive portion and a negative portion,
wherein the positive portion and negative portion are adjacent to and connected to the one or more removable portions; and
wherein the mandrel includes a passage from the first face to the second face dividing the positive and negative portions;
a positive electrode attached to the positive portion;
a negative electrode attached to the negative portion;
a positive feedthrough pin;
a negative feedthrough pin;
a first separator; and
a second separator
wherein the positive portion has a groove configured to accept the positive feedthrough pin and the negative portion has a groove configured to accept the negative feedthrough pin;
wherein the positive electrode and the positive feedthrough pin are conductively connected to the mandrel on the positive portion;
wherein the negative electrode and the negative feedthrough pin are conductively connected to the mandrel on the negative portion; and
wherein the first separator is attached to the positive portion and the second separator is attached to the negative portion.

28. The electrode assembly of paragraph 27, wherein the removable portion connects the positive portion and the negative portion.

29. The electrode assembly of either paragraphs 27 or 28, wherein the positive and negative feedthrough pins are independently selected from steel, platinum, aluminum, titanium, niobium, molybdenum, platinum-iridium, and copper and their alloys.

30. The electrode assembly of any of paragraphs 27 through 29, wherein the positive and negative electrode materials are independently selected from aluminum, steel, silver, copper, nickel, titanium or alloys thereof.

31. The electrode assembly of paragraph 30, wherein the positive electrode is coated with a positive active material selected from lithium cobalt oxide (rechargeable), carbon monofluoride ($CF_x$), silver vanadium oxide (primary), and combinations thereof.

32. The electrode assembly of paragraph 30, wherein the negative electrode is coated with a negative active material selected from lithium titanate, artificial graphite powder (MCMB) or lithium.

33. The electrode assembly of any of paragraphs 27 through 32, wherein the mandrel is formed from an electrically conductive material selected from stainless steel, aluminum, titanium, nickel, copper and combinations thereof.

34. The electrode assembly of any of paragraphs 27 through 32, wherein the mandrel is formed from a non-electrically conductive material selected from polypropylene, polyethylene, or poly(ethylene-co-tetrafluoroethylene) (ETFE).

35. The electrode assembly of any of paragraphs 27 through 34, wherein the positive feedthrough pin is placed in the groove in the positive portion and negative feedthrough pin is placed in the groove in the negative portion.

36. The electrode assembly of any of paragraphs 27 through 35, wherein the positive electrode, the negative electrode, or both is/are interposed in the groove between the positive feedthrough pin or negative feedthrough pin and the mandrel.

37. The electrode assembly of any of paragraphs 24 through 36, wherein the separators are formed of polyethylene, polypropylene or layered combinations thereof.

38. The electrode assembly of any of paragraphs 24 through 37, wherein the mandrel is planar.

39. The electrode assembly of any of paragraphs 24 through 38, wherein the one or more removable portions are detached.

40. A method of preparing an electrode assembly comprising:
- providing a mandrel having two faces and a positive portion and a negative portion,
- wherein the positive portion and negative portion are adjacent to and connected to the one or more removable portions; and
- wherein the mandrel includes a passage from the first face to the second face dividing the positive and negative portions;
- providing a positive electrode;
- providing a negative electrode;
- providing a positive feedthrough pin;
- providing a negative feedthrough pin;
- providing a groove on the positive portion configured to accept the positive feedthrough pin;
- providing a groove on the negative portion configured to accept the negative feedthrough pin;
- conductively connecting the positive feedthrough pin and the positive electrode to the positive portion of the mandrel;
- conductively connecting the negative feedthrough pin and the negative electrode to the negative portion of the mandrel; and
- providing a first separator attached to the positive portion; and
- providing a second separator attached to the negative portion.

41. The method of preparing an electrode assembly of paragraph 40, wherein the removable portion connects the positive portion and the negative portion.

42. The method of preparing an electrode assembly of either paragraphs 40 or 41, wherein the positive and negative feedthrough pins are independently selected from steel, platinum, aluminum, titanium, niobium, molybdenum, platinum-iridium, and copper and their alloys.

43. The method of preparing an electrode assembly of any of paragraphs 40 through 42, wherein the positive and negative electrode materials are independently selected from aluminum, steel, silver, copper, nickel, titanium or alloys thereof.

44. The method of preparing an electrode assembly of paragraph 43, wherein the positive electrode is coated with a positive active material selected from lithium cobalt oxide (rechargeable), carbon monofluoride ($CF_x$), silver vanadium oxide (primary), and combinations thereof.

45. The method of preparing an electrode assembly of paragraph 43, wherein the negative electrode is coated with a negative active material selected from lithium titanate, artificial graphite powder (MCMB) or lithium.

46. The method of preparing an electrode assembly of any of paragraphs 40 through 45, wherein the mandrel is formed from an electrically conductive material selected from stainless steel, aluminum, titanium, nickel, copper and combinations thereof.

47. The method of preparing an electrode assembly of any of paragraphs 40 through 45, wherein the mandrel is formed from a non-electrically conductive material selected from polypropylene, polyethylene, or poly(ethylene-co-tetrafluoroethylene) (ETFE).

48. The method of preparing an electrode assembly of any of paragraphs 40 through 47, further comprising the steps of placing the positive feedthrough pin in the positive portion groove and placing the negative feedthrough pin in the negative portion groove.

49. The method of preparing an electrode assembly of any of paragraphs 40 through 48, wherein the positive electrode, the negative electrode, or both is/are interposed in the groove between the positive feedthrough pin or negative feedthrough pin and the mandrel.

50. The method of preparing an electrode assembly of any of paragraphs 40 through 49, wherein the mandrel is planar.

51. The method of preparing an electrode assembly of any of paragraphs 40 through 50, further comprising the step of rotating the mandrel about an axis to wind the electrodes and first and second separators around the mandrel.

52. The method of preparing an electrode assembly of any of paragraphs 40 through 50, further comprising the step of detaching the one or more removable portions.

The following paragraphs enumerated consecutively from 1 through 53 provide for various aspects of the present invention. In one embodiment, in a first paragraph (1), the present invention provides an electrode assembly comprising:
- a mandrel comprising a positive portion, a negative portion, and one or more removable portions;
- wherein the positive portion and negative portion are adjacent to and connected to the one or more removable portions; and
- wherein the mandrel includes a passage from the first face to the second face dividing the positive and negative portions;
- a positive electrode attached to the positive portion;
- a negative electrode attached to the negative portion;
- a positive feedthrough pin;
- a negative feedthrough pin; and
- a separator;
- wherein the positive portion has a groove configured to accept the positive feedthrough pin and the negative portion has a groove configured to accept the negative feedthrough pin;
- wherein the positive electrode and the positive feedthrough pin are conductively connected to the mandrel on the positive portion;
- wherein the negative electrode and the negative feedthrough pin are conductively connected to the mandrel on the negative portion;
- wherein the separator passes through the passage in the mandrel so as to be interposed to the positive portion on the first face and the negative portion on the second face;
- wherein the electrodes and separator when wound about the mandrel provide an excess segment of separator; and
- wherein the excess segment of separator is heat sealed to an underlying layer of separator.

2. The electrode assembly of paragraph 1, wherein the removable portion connects the positive portion and the negative portion.

3. The electrode assembly of either paragraphs 1 or 2, wherein the positive and negative feedthrough pins are independently selected from steel, platinum, aluminum, titanium, niobium, molybdenum, platinum-iridium, and copper and their alloys.

4. The electrode assembly of any of paragraphs 1 through 3, wherein the positive and negative electrode materials are independently selected from aluminum, steel, silver, copper, nickel, titanium or alloys thereof.

5. The electrode assembly of paragraph 4, wherein the positive electrode is coated with a positive active material selected from lithium cobalt oxide (rechargeable), carbon monofluoride ($CF_x$), silver vanadium oxide (primary), or combinations thereof.

6. The electrode assembly of paragraph 4, wherein the negative electrode is coated with a negative active material selected from lithium titanate, artificial graphite powder (MCMB), lithium, or combinations thereof.

7. The electrode assembly of any of paragraphs 1 through 6, wherein the mandrel is formed from an electrically conductive material selected from stainless steel, aluminum, titanium, nickel, copper, or combinations thereof.

8. The electrode assembly of any of paragraphs 1 through 6, wherein the mandrel is formed from a non-electrically conductive material selected from polypropylene, polyethylene, or poly(ethylene-co-tetrafluoroethylene) (ETFE).

9. The electrode assembly of any of paragraphs 1 through 8, wherein the positive feedthrough pin is placed in the groove in the positive portion and negative feedthrough pin is placed in the groove in the negative portion.

10. The electrode assembly of any of paragraphs 1 through 9, wherein the positive electrode, the negative electrode, or both is/are interposed in the groove between the positive feedthrough pin or negative feedthrough pin and the mandrel.

11. The electrode assembly of any of paragraphs 1 through 10, wherein the separator is formed of polyethylene, polypropylene or layered combinations thereof.

12. The electrode assembly of any of paragraphs 1 through 11, wherein the mandrel is planar.

13. The electrode assembly of any of paragraphs 1 through 12, wherein the one or more removable portions are detached.

14. A method of preparing an electrode assembly comprising:
   providing a mandrel comprising a positive portion, a negative portion, and one or more removable portions;
   wherein the positive portion and negative portion are adjacent to and connected to the one or more removable portions; and
   wherein the mandrel includes a passage from the first face to the second face dividing the positive and negative portions;
   providing a positive electrode;
   providing a negative electrode;
   providing a positive feedthrough pin;
   providing a negative feedthrough pin;
   providing a groove on the positive portion configured to accept the positive feedthrough pin;
   providing a groove on the negative portion configured to accept the negative feedthrough pin;
   conductively connecting the positive feedthrough pin and the positive electrode to the positive portion of the mandrel;
   conductively connecting the negative feedthrough pin and the negative electrode to the negative portion of the mandrel;
   providing a separator that passes through the passage in the mandrel so as to be interposed to the positive portion on the first face and the negative portion on the second face;
   rotating the mandrel about an axis to wind the electrodes and separator around the mandrel, wherein an excess segment of separator is provided; and
   heat sealing the excess segment of separator to an underlying layer of separator.

15. The method of preparing an electrode assembly of paragraph 14, wherein the removable portion connects the positive portion and the negative portion.

16. The method of preparing an electrode assembly of either paragraphs 14 or 15, wherein the positive and negative feedthrough pins are independently selected from steel, platinum, aluminum, titanium, niobium, molybdenum, platinum-iridium, copper and their alloys.

17. The method of preparing an electrode assembly of any of paragraphs 14 through 16, wherein the positive and negative electrode materials are independently selected from aluminum, steel, silver, copper, nickel, titanium or alloys thereof.

18. The method of preparing an electrode assembly of paragraph 17, wherein the positive electrode is coated with a positive active material selected from lithium cobalt oxide (rechargeable), carbon monofluoride ($CF_x$), silver vanadium oxide (primary), or combinations thereof.

19. The method of preparing an electrode assembly of paragraph 17, wherein the negative electrode is coated with a negative active material selected from lithium titanate, artificial graphite powder (MCMB), lithium, or combinations thereof.

20. The method of preparing an electrode assembly of any of paragraphs 14 through 19, wherein the mandrel is formed from an electrically conductive material selected from stainless steel, aluminum, titanium, nickel, copper, or combinations thereof.

21. The method of preparing an electrode assembly of any of paragraphs 14 through 19, wherein the mandrel is formed from a non-electrically conductive material selected from polypropylene, polyethylene, or poly(ethylene-co-tetrafluoroethylene) (ETFE).

22. The method of preparing an electrode assembly of any of paragraphs 14 through 21, further comprising the steps of placing the positive feedthrough pin in the positive portion groove and placing the negative feedthrough pin in the negative portion groove.

23. The method of preparing an electrode assembly of any of paragraphs 14 through 22, wherein the positive electrode, the negative electrode, or both is/are interposed in the groove between the positive feedthrough pin or negative feedthrough pin and the mandrel.

24. The method of preparing an electrode assembly of any of paragraphs 14 through 23, wherein the mandrel is planar.

25. The method of preparing an electrode assembly of any of paragraphs 14 through 24, wherein the heat sealing of the separator strip is by impulse heat.

26. The method of preparing an electrode assembly of any of paragraphs 14 through 25, further comprising the step of detaching the one or more removable portions.

27. An electrode assembly comprising:
   a mandrel comprising a positive portion, a negative portion, and one or more removable portions;
   wherein the positive portion and negative portion are adjacent to and connected to the one or more removable portions; and
   wherein the mandrel includes a passage from the first face to the second face dividing the positive and negative portions;
   a positive electrode attached to the positive portion;
   a negative electrode attached to the negative portion;
   a positive feedthrough pin;
   a negative feedthrough pin;
   a first separator; and
   a second separator
   wherein the positive portion has a groove configured to accept the positive feedthrough pin and the negative portion has a groove configured to accept the negative feedthrough pin;

wherein the positive electrode and the positive feedthrough pin are conductively connected to the mandrel on the positive portion;

wherein the negative electrode and the negative feedthrough pin are conductively connected to the mandrel on the negative portion;

wherein the first separator is attached to the positive portion and the second separator is attached to the negative portion;

wherein the electrodes and separator when wound about the mandrel provide an excess segment of the first or second separator; and wherein the excess segment of separator is heat sealed to an underlying layer of separator.

28. The electrode assembly of paragraph 27, wherein the removable portion connects the positive portion and the negative portion.

29. The electrode assembly of either paragraphs 27 or 28, wherein the positive and negative feedthrough pins are independently selected from steel, platinum, aluminum, titanium, niobium, molybdenum, platinum-iridium, and copper and their alloys.

30. The electrode assembly of any of paragraphs 27 through 29, wherein the positive and negative electrode materials are independently selected from aluminum, steel, silver, copper, nickel, titanium, or alloys thereof.

31. The electrode assembly of paragraph 30, wherein the positive electrode is coated with a positive active material selected from lithium cobalt oxide (rechargeable), carbon monofluoride ($CF_x$), silver vanadium oxide (primary), or combinations thereof.

32. The electrode assembly of paragraph 30, wherein the negative electrode is coated with a negative active material selected from lithium titanate, artificial graphite powder (MCMB), lithium, or combinations thereof.

33. The electrode assembly of any of paragraphs 27 through 32, wherein the mandrel is formed from an electrically conductive material selected from stainless steel, aluminum, titanium, nickel, copper, or combinations thereof.

34. The electrode assembly of any of paragraphs 27 through 32, wherein the mandrel is formed from a non-electrically conductive material selected from polypropylene, polyethylene, or poly(ethylene-co-tetrafluoroethylene) (ETFE).

35. The electrode assembly of any of paragraphs 27 through 34, wherein the positive feedthrough pin is placed in the groove in the positive portion and negative feedthrough pin is placed in the groove in the negative portion.

36. The electrode assembly of any of paragraphs 27 through 35, wherein the positive electrode, the negative electrode, or both is/are interposed in the groove between the positive feedthrough pin or negative feedthrough pin and the mandrel.

37. The electrode assembly of any of paragraphs 27 through 36, wherein the separators are formed of polyethylene, polypropylene or layered combinations thereof.

38. The electrode assembly of any of paragraphs 27 through 37, wherein the mandrel is planar.

39. The electrode assembly of any of paragraphs 24 through 38, wherein the one or more removable portions are detached.

40. A method of preparing an electrode assembly comprising:

providing a mandrel comprising a positive portion, a negative portion, and one or more removable portions;

wherein the positive portion and negative portion are adjacent to and connected to the one or more removable portions; and wherein the mandrel includes a passage from the first face to the second face dividing the positive and negative portions;

providing a positive electrode;

providing a negative electrode;

providing a positive feedthrough pin;

providing a negative feedthrough pin;

providing a groove on the positive portion configured to accept the positive feedthrough pin;

providing a groove on the negative portion configured to accept the negative feedthrough pin;

conductively connecting the positive feedthrough pin and the positive electrode to the positive portion of the mandrel;

conductively connecting the negative feedthrough pin and the negative electrode to the negative portion of the mandrel; and providing a first separator attached to the positive portion;

providing a second separator attached to the negative portion;

rotating the mandrel about an axis to wind the electrodes and separators around the mandrel, providing an excess portion of first or second separator; and heat sealing the excess portion of separator to an underlying layer of separator.

41. The method of preparing an electrode assembly of paragraph 40, wherein the removable portion connects the positive portion and the negative portion.

42. The method of preparing an electrode assembly of either paragraphs 40 or 41, wherein the positive and negative feedthrough pins are independently selected from steel, platinum, aluminum, titanium, niobium, molybdenum, platinum-iridium, and copper and their alloys.

43. The method of preparing an electrode assembly of any of paragraphs 40 through 42, wherein the positive and negative electrode materials are independently selected from aluminum, steel, silver, copper, nickel, titanium or alloys thereof.

44. The method of preparing an electrode assembly of paragraph 43, wherein the positive electrode is coated with a positive active material selected from lithium cobalt oxide (rechargeable), carbon monofluoride ($CF_x$), silver vanadium oxide (primary), and combinations thereof.

45. The method of preparing an electrode assembly of paragraph 43, wherein the negative electrode is coated with a negative active material selected from lithium titanate, artificial graphite powder (MCMB) or lithium.

46. The method of preparing an electrode assembly of any of paragraphs 40 through 45, wherein the mandrel is formed from an electrically conductive material selected from stainless steel, aluminum, titanium, nickel, copper and combinations thereof.

47. The method of preparing an electrode assembly of any of paragraphs 40 through 45, wherein the mandrel is formed from a non-electrically conductive material selected from polypropylene, polyethylene, or poly(ethylene-co-tetrafluoroethylene) (ETFE).

48. The method of preparing an electrode assembly of any of paragraphs 40 through 47, further comprising the steps of placing the positive feedthrough pin in the positive portion groove and placing the negative feedthrough pin in the negative portion groove.

49. The method of preparing an electrode assembly of any of paragraphs 40 through 48, wherein the positive electrode, the negative electrode, or both is/are interposed in the groove between the positive feedthrough pin or negative feedthrough pin and the mandrel.

50. The method of preparing an electrode assembly of any of paragraphs 40 through 49, wherein the mandrel is planar.

51. The method of preparing an electrode assembly of any of paragraphs 40 through 50, wherein the heat sealing of the separator strip is by impulse heat.

52. The method of preparing an electrode assembly of any of paragraphs 40 through 51, further comprising the step of detaching the one or more removable portions.

53. A battery assembly comprising the electrode assembly of either of paragraphs 13 or 39, further comprising a case.

While this invention has been described in conjunction with the various exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments according to this invention, as set forth above, are intended to be illustrative not limiting. Various changes may be made without departing from the spirit and scope of the invention. Therefore, the invention is intended to embrace all known or later-developed alternatives, modifications, variations, improvements and/or substantial equivalents of these exemplary embodiments.

What is claimed is:

1. An electrode assembly comprising:
   a mandrel comprising a positive portion, a negative portion, a breakaway incision and one or more removable portions;
   wherein the positive portion and negative portion are adjacent to and connected to the one or more removable portions; and
   wherein the mandrel includes a passage from a first face of the mandrel to a second face of the mandrel dividing the positive and negative portions;
   a positive electrode attached to the positive portion;
   a negative electrode attached to the negative portion;
   a positive feedthrough pin; and
   a negative feedthrough pin;
   wherein the positive portion has a groove configured to accept the positive feedthrough pin and the negative portion has a groove configured to accept the negative feedthrough pin;
   wherein the positive electrode and the positive feedthrough pin are conductively connected electrically to the mandrel on the positive portion;
   wherein the negative electrode and the negative feedthrough pin are conductively connected electrically to the mandrel on the negative portion; and
   wherein the one or more removable portions are detachable by the breakaway incision.

2. The electrode assembly of claim 1, wherein the one or more removable portions connect the positive portion and the negative portion.

3. The electrode assembly of claim 1, wherein the positive and negative feedthrough pins are independently selected from steel, platinum, aluminum, titanium, niobium, molybdenum, platinum-iridium, and copper and their alloys.

4. The electrode assembly of claim 1, wherein the positive and negative electrode materials are independently selected from aluminum, steel, silver, copper, nickel, titanium or alloys thereof.

5. The electrode assembly of claim 4, wherein the positive electrode is coated with a positive active material selected from lithium cobalt oxide, carbon monofluoride, silver vanadium oxide, or combinations thereof.

6. The electrode assembly of claim 4, wherein the negative electrode is coated with a negative active material selected from lithium titanate, artificial graphite powder, lithium or combinations thereof.

7. The electrode assembly of claim 1, wherein the mandrel is formed from an electrically conductive material selected from stainless steel, aluminum, titanium, nickel, copper or combinations thereof.

8. The electrode assembly of claim 1, wherein the mandrel is formed from a non-electrically conductive material selected from polypropylene, polyethylene, or poly(ethylene-co-tetrafluoroethylene).

9. The electrode assembly of claim 1, wherein the positive feedthrough pin is placed in the groove in the positive portion and negative feedthrough pin is placed in the groove in the negative portion.

10. The electrode assembly of claim 1, wherein the positive, the negative electrode, or both is/are interposed in the groove between the positive feedthrough pin or negative feedthrough pin and the mandrel.

11. The electrode assembly of claim 1, wherein the mandrel is planar.

12. A method of preparing an electrode assembly comprising:
    providing a mandrel comprising a positive portion, a negative portion, a breakaway incision and one or more removable portions;
    wherein the positive portion and negative portion are adjacent to and connected to the one or more removable portions; and
    wherein the mandrel includes a passage from a first face of the mandrel to a second face of the mandrel dividing the positive and negative portions;
    providing a positive electrode;
    providing a negative electrode;
    providing a positive feedthrough pin;
    providing a negative feedthrough pin;
    providing a groove on the positive portion configured to accept the positive feedthrough pin;
    providing a groove on the negative portion configured to accept the negative feedthrough pin;
    conductively connecting electrically the positive feedthrough pin and the positive electrode to the positive portion of the mandrel;
    conductively connecting electrically the negative feedthrough pin and the negative electrode to the negative portion of the mandrel; and
    wherein the one or more removable portions are detachable by the breakaway incision.

13. The method of preparing an electrode assembly of claim 12, wherein the one or more removable portions connect the positive portion and the negative portion.

14. The method of preparing an electrode assembly of claim 12, wherein the positive and negative feedthrough pins are independently selected from steel, platinum, aluminum, titanium, niobium, molybdenum, platinum-iridium, and copper and their alloys.

15. The method of preparing an electrode assembly of claim 12, wherein the positive and negative electrode materials are independently selected from aluminum, steel, silver, copper, nickel, titanium, or alloys thereof.

16. The method of preparing an electrode assembly of claim 15, wherein the positive electrode is coated with a positive active material selected from lithium cobalt oxide, carbon monofluoride, silver vanadium oxide, or combinations thereof.

17. The method of preparing an electrode assembly of claim 15, wherein the negative electrode is coated with a negative active material selected from lithium titanate, artificial graphite powder, lithium, or combinations thereof.

18. The method of preparing an electrode assembly of claim 12, wherein the mandrel is formed from an electrically conductive material selected from stainless steel, aluminum, titanium, nickel, copper, or combinations thereof.

19. The method of preparing an electrode assembly of claim 12, wherein the mandrel is formed from a non-electrically conductive material selected from polypropylene, polyethylene, or poly(ethylene-co-tetrafluoroethylene).

20. The method of preparing an electrode assembly of claim 12, further comprising the steps of placing the positive feedthrough pin in the positive portion groove and placing the negative feedthrough pin in the negative portion groove.

21. The method of preparing an electrode assembly of claim 12, wherein the positive electrode, the negative electrode, or both is/are interposed in the groove between the positive feedthrough pin or negative feedthrough pin and the mandrel.

22. The method of preparing an electrode assembly of claim 12, wherein the mandrel is planar.

\* \* \* \* \*